(12) United States Patent
Kojima et al.

(10) Patent No.: US 8,899,814 B2
(45) Date of Patent: Dec. 2, 2014

(54) OPTICAL SHEET WITH UNIT PRISMS INCLUDING UNIT PRISM GROUPS

(75) Inventors: Hiroshi Kojima, Kawagoe (JP); Satoshi Goishihara, Kazo (JP); Satoko Maenishi, Saitama (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 152 days.

(21) Appl. No.: 13/202,428

(22) PCT Filed: Feb. 25, 2010

(86) PCT No.: PCT/JP2010/052977
§ 371 (c)(1),
(2), (4) Date: Aug. 19, 2011

(87) PCT Pub. No.: WO2010/098389
PCT Pub. Date: Sep. 2, 2010

(65) Prior Publication Data
US 2011/0299270 A1   Dec. 8, 2011

(30) Foreign Application Priority Data

Feb. 26, 2009  (JP) ................................. 2009-044048
Dec. 28, 2009  (JP) ................................. 2009-298550

(51) Int. Cl.
| F21V 7/04 | (2006.01) |
| F21V 8/00 | (2006.01) |
| G02B 5/04 | (2006.01) |
| G02F 1/1335 | (2006.01) |

(52) U.S. Cl.
CPC ........ *G02B 6/0065* (2013.01); *G02F 1/133611* (2013.01); *G02B 5/045* (2013.01); *G02B 6/0053* (2013.01); *G02B 6/0078* (2013.01); *G02F 1/133606* (2013.01); *G02F 2001/133607* (2013.01)
USPC ............................ 362/615; 362/620; 362/626

(58) Field of Classification Search
CPC .... G02B 5/021; G02B 5/0045; G02B 5/0015; G02B 6/0016; G02B 6/0038; G02B 6/0053; G02F 1/133606; G02F 1/133611; G02F 2001/133607
USPC ...................... 362/617–620, 615, 626; 349/64
See application file for complete search history.

(56) References Cited

U.S. PATENT DOCUMENTS 6,354,709 B1  3/2002 Campbell et al.
7,052,152 B2 * 5/2006 Harbers et al. .................. 362/30
(Continued)

FOREIGN PATENT DOCUMENTS

JP  08-304608     11/1996
JP  08-304608 A1  11/1996
(Continued)

OTHER PUBLICATIONS

Chinese Office Action mailed Feb. 1, 2013 (with English translation).

(Continued)

*Primary Examiner* — Robert May
(74) *Attorney, Agent, or Firm* — Burr & Brown, PLLC

(57) ABSTRACT

An optical sheet includes a sheet-like body portion, and unit prisms arranged on one surface of the body portion. Each unit prism extends linearly in a direction intersecting the arrangement direction. Each unit prism, when viewed in a direction parallel to the arrangement direction of the unit prisms, has an uneven polygonal-line-shaped contour and, with reference to raised portions defined by the polygonal-line-shaped contour of each unit prism, the distance between a top of each raised portion, a farthest point from the body portion in the raised portion, and the body portion in the normal direction of the body portion is not constant. The optical sheet can prevent significant problems when it is superimposed on another member.

12 Claims, 12 Drawing Sheets

(56) References Cited

U.S. PATENT DOCUMENTS

| | | |
|---|---|---|
| 7,072,092 B2 | 7/2006 | Olczak |
| 7,397,605 B2 * | 7/2008 | Mai .............................. 359/599 |
| 8,136,976 B2 * | 3/2012 | Wang et al. ................... 362/620 |
| 8,436,960 B2 * | 5/2013 | Teragawa ........................ 349/62 |
| 2005/0265029 A1 | 12/2005 | Epstein et al. |
| 2007/0010594 A1 | 1/2007 | Wang et al. |
| 2009/0154197 A1* | 6/2009 | Sun et al. ...................... 362/618 |

FOREIGN PATENT DOCUMENTS

| | | | |
|---|---|---|---|
| JP | 10-319216 A1 | 12/1998 |
| JP | 2001-004814 A1 | 1/2001 |
| JP | 2002-504698 A1 | 2/2002 |
| JP | 2008-503034 A1 | 1/2008 |
| JP | 2008-242268 A1 | 10/2008 |
| JP | 2008-242269 A1 | 10/2008 |
| JP | 2008-544303 A1 | 12/2008 |
| WO | WO 2008056473 A1 * | 5/2008 |

OTHER PUBLICATIONS

Japanese Office Action dated May 7, 2013 (with English translation).

* cited by examiner

OPTICAL SHEET WITH UNIT PRISMS INCLUDING UNIT PRISM GROUPS

BACKGROUND OF THE INVENTION

1. Field of the Invention

The present invention relates to a sheet for changing the travel direction of light, and more particularly to an optical sheet which can prevent cause significant problems when it is superimposed on another member. The present invention also relates to a surface light source device, a transmission type display device and a light emitting device each having such a useful optical sheet. Further, the present invention relates to a mold for molding such a useful optical sheet and to a method for producing the mold.

2. Description of Related Art

A surface light source device which, together with a transmission type display unit (e.g. liquid crystal panel), constitutes a transmission type display device, includes a light source and a number of optical sheets (optical films) for changing the travel direction of light from the light source, as disclosed e.g. in JP 8-304608A, U.S. Pat. No. 7,072,092 and JP 2008-544303T.

In general, the number of optical sheets include an optical sheet having a function (light diffusing function) to diffuse light from the light source, thereby blurring or obscuring the image of the light source, an optical sheet having a function (light condensing function) to change the travel direction of light so that the angle (exit angle) between the direction of the exiting light and the front direction becomes smaller, thereby enhancing the front direction luminance, etc.

Among optical sheets having a light condensing function is widely used an optical sheet having linearly-extending unit prisms (unit optical elements) arranged in a direction perpendicular to the longitudinal direction of the prisms (so-called linear array arrangement) (JP 8-304608A and U.S. Pat. No. 7,072,092). The unit prisms of the optical sheet each typically have a triangular, ellipsoidal or circular cross-sectional shape. Such unit prisms thus have ridge lines extending in the longitudinal direction. An optical sheet, having unit prisms each having the cross-sectional shape of an isosceles triangle (typically an isosceles right triangle) which is symmetrical with respect to an axis extending in the front direction, is currently considered to be capable of providing the highest level of front direction luminance.

Various problems may arise when two optical sheets are superimposed on each other, or when the light exit side surface (light outgoing side surface) of a surface light source device and the light entrance side surface (light incident side surface) of a transmission type display unit are superimposed on each other and optically unified. Specifically, a bright spot may be produced in a region where two members are superimposed on each other due to the phenomenon (so-called "direct passage of light") of light passing through the region without being subject to an optical action. A stripe pattern (like so-called "Newton's rings") may be produced in a region where two members are superimposed on each other. Further, a wetting pattern (also called "wet-out") like staining with a liquid may be produced in a region where two members are superimposed on each other. It has been found through the present inventors' studies that such problems arise not only when the surfaces of two members make plane contact with each other but also when the unit prisms of the above described optical sheet, having the ridge lines, make contact with another member.

It is conventional practice to dispose a light diffusing sheet between an optical sheet and a transmission type display unit in order to reduce such problems. On the other hand, with a view to producing thinner display devices and lowering the production cost, there is a demand in these days for solving the problems without using a light diffusing sheet.

JP 8-304608A discloses another method to address the problems. In the optical sheet disclosed in JP 8-304608A, the ridge lines of the unit prisms undulate moderately in a curved line in the height direction. Accordingly, the optical sheet makes contact with another member only in the locally high ridge portions of the unit prisms. The method of JP 8-304608A thus decreases the contact area between the optical sheet and another member so as to reduce problems due to contact between them. However, in view of influence on the quality of display images and also of the production cost, it is not possible in actual mass production to produce an optical sheet with unit prisms having largely varying heights. Thus, the unit prisms having moderately undulating curved ridge lines make contact with another member in a larger area than has been expected, making it impossible to fully solve the problems. Further, the contact area between the optical sheet of JP 8-304608A and an adjacent member can significantly increase when the contact pressure between them increases due to deformation of the optical sheet caused e.g. by moisture absorption or thermal expansion. For these reasons, it is not practically possible for the optical sheet of JP 8-304608A to substantially solve the above problems.

In the optical sheet disclosed in U.S. Pat. No. 7,072,092, the unit prisms each undulate continuously and moderately in a direction parallel to the sheet plane. This method can reduce interference between the arrangement of the unit prisms and the arrangement of pixels in a transmission type display unit. However, the unit prisms are generally arranged closely (at short repetition intervals) in order to prevent "direct passage of light". Thus, because of constraint by adjacent unit prisms, the degree of horizontal undulation of each unit prism cannot be made sufficiently large. Furthermore, the optical sheet of U.S. Pat. No. 7,072,092 is not effective to solve the problems of "direct passage of light" and "wet-out". For these reasons, it is not practically possible for the optical sheet of U.S. Pat. No. 7,072,092 to substantially solve the above problems.

On the other hand, JP 2008-544303T discloses an optical sheet having a two-dimensional arrangement of large number of irregular prism blocks. The large number of prism blocks is arranged irregularly on a base and, in addition, the prism block construction, such as the shape and the dimensions, vary irregularly among the large number of prism blocks. Because of the irregularity of the surfaces of the irregular prism blocks, the optical sheet disclosed in JP 2008-544303T is expected to be capable of reducing the problems associated with its contact with another member. However, the optical effect of the optical sheet of JP 2008-544303T is completely different from that of an optical sheet having a linear array of linearly-extending unit prisms; in particular, the effect of condensing light into a particular direction component is significantly lower. Thus, the optical sheet of JP 2008-544303T cannot be simply replaced with an optical sheet having a linear array of linearly-extending unit prisms e.g. in a surface light source device. Further, as described in JP 2008-544303T, the optical sheet is generally produced by molding using a mold. In the production of a mold for the optical sheet of JP 2008-544303T, it is necessary to form in the mold a large number of recesses corresponding to the prism blocks having irregular shapes and arranged irregularly. The production of such a mold is very difficult and incurs a considerably increased production cost. This leads to a considerably high production cost of the optical sheet of JP 2008-544303T compared to an optical sheet having a linear array of linearly-extending unit prisms.

As described hereinabove, the problems that arise when superimposing an optical sheet having unit prisms on another member have not been fully solved as yet.

Devices, including a light source and an optical sheet(s) which receives light from the light source, are widely used as light emitting devices having various light emitting functions (including illuminating functions), for example, a lighting device (illuminating device), an indicator light, a sign (signboard), a mark, etc. The above-described problems with a surface light source device or a display device may likewise arise in such a light emitting device when the device includes a plurality of optical sheets or when an optical sheet of the device makes contact with a member adjacent to the device.

Further, in a surface light source device, two optical sheets having unit prisms are often used such that they are superimposed on each other with their ridge line directions intersecting each other. In the actual use of a surface light source device including such two optical sheets, the front direction luminance is sometimes considerably lower (by a few percent) than an expected design value. Nowadays, when environmental issues are attracting continued attention, enhancement of the energy efficiency in a surface light source device is an important problem. It is favorable if this problem can also be solved by the present invention.

SUMMARY OF THE INVENTION

The present invention has been made in view of the above situation. It is therefore an object of the present invention to provide an optical sheet having unit prisms, which can alleviate or overcome the problems which have been encountered when a conventional optical sheet is superimposed on another member. It is another object of the present invention to provide a surface light source device, a transmission type display device and a light emitting device each having the optical sheet. It is yet another object of the present invention to provide a mold for molding the optical sheet, and a method for producing the mold.

A first optical sheet according to the present invention comprises: a sheet-like body portion; and unit prisms arranged on one surface of the body portion in an arrangement direction and each extending linearly in a direction intersecting the arrangement direction, wherein each unit prism, when viewed in a direction parallel to the arrangement direction of the unit prisms, has an uneven polygonal-line-shaped contour, and wherein with reference to raised portions defined by the polygonal-line-shaped contour of each unit prism, a distance between a top of each raised portion, a farthest point from the body portion in the raised portion, and the body portion in a normal direction of the body portion is not constant.

A second optical sheet according to the present invention comprises: a sheet-like body portion; and unit prisms arranged on one surface of the body portion in an arrangement direction and each extending linearly in a direction intersecting the arrangement direction, wherein each unit prism has a ridge line extending in a longitudinal direction of the unit prism, wherein the ridge line is an uneven polygonal-line, in a cross-section parallel to both a normal direction of the body portion and a direction of the ridge line of the unit prism and containing the ridge line, and wherein with reference to raised portions defined by the polygonal-line-shaped contour of each unit prism, a distance between a top of each raised portion, a farthest point from the body portion in the raised portion, and the body portion in a normal direction of the body portion is not constant.

In the first or second optical sheet according to the present invention, the raised portions defined by the polygonal-line-shaped contour may each include a polygonal-shape.

In the first or second optical sheet according to the present invention, with reference to two raised portions adjacent to each other in the longitudinal direction of the unit prism, the distance of the top of one raised portion from the body portion in the normal direction of the body portion may differ from that of the other raised portion.

In the first or second optical sheet according to the present invention, each unit prism may extend on the one surface of the body portion from one edge of the one surface to the opposite edge, and the unit prisms, when viewed in the normal direction of the body portion, may extend linearly parallel to each other.

Preferably in the first or second optical sheet according to the present invention, the unit prisms may include unit prism groups, each unit prism group having at least two unit prisms, and the at least two unit prisms are arranged side by side in the arrangement direction and have different constructions; the unit prism groups may be arranged side by side in the arrangement direction of the unit prisms and have the same construction; and a cross-sectional shape of the at least two unit prisms forming one unit prism group, in a main cross-section parallel to both the normal direction of the body portion and the arrangement direction of the unit prisms and at one position in a longitudinal direction of the unit prisms, may be identical to the cross-sectional shape of unit prisms the number of which is the same as the at least two unit prisms and which are arranged side by side in an area spanning the one unit prism group and an adjacent unit prism group, in the main cross-section and at a certain position at a distance from the one position in the longitudinal direction of the unit prisms.

In the first or second optical sheet according to the present invention, a cross-sectional shape of each unit prism, in a main cross-section parallel to both the normal direction of the body portion and the arrangement direction of the unit prisms, may include an isosceles triangle which is symmetrical with respect to an axis extending in the normal direction of the body portion. The total light beam transmittance of the optical sheet, measured in accordance with JIS K 7361 in such a manner that the surface of the unit prisms serves as a light exit surface, may be not more than 4.5%.

A first surface light source device according to the present invention comprises: a light source; and the above-described first or second optical sheet of the present invention which receives light from the light source. In the surface light source device of the present invention, the optical sheet may be disposed such that the unit prism-side surface constitutes a light emitting surface.

A second surface light source device according to the present invention comprises: a light source; a first optical sheet which receives light from the light source; and a second optical sheet which receives light from the light source, the second optical sheet being disposed opposite to the first optical sheet, wherein the first optical sheet and the second optical sheet each include a sheet-like body portion, and unit prisms arranged on one surface of the body portion and each extending linearly in a direction intersecting an arrangement direction, wherein the first optical sheet and the second optical sheet are disposed such that the arrangement direction of the unit prisms of the first optical sheet intersects the arrangement direction of the unit prisms of the second optical sheet, and wherein at least one of the first optical sheet and the second optical sheet is one of the above-described optical sheets according to the present invention.

A transmission, type display device according to the present invention comprises: a transmission type display unit; and the above-described first or second surface light source device of the present invention, disposed opposite to the transmission type display unit.

The present invention also provides a mold for molding of an optical sheet having unit prisms, comprising a roll shaped mold having a circular cylindrical mold surface, wherein at least one groove, corresponding to the unit prisms and extending spirally around a central axis of the mold surface, is formed in the mold surface, wherein the depth of the groove changes in a polygonal-line manner along a longitudinal direction of the groove, with the bottom of the groove being uneven along the longitudinal direction of the groove, and wherein a depth of the groove at the deepest point in each of recessed portions formed by the bottom of the groove is not constant.

In an embodiment of the mold according to the present invention, the spiral groove includes unit sections arranged adjacent to each other in the longitudinal direction, the unit sections having the same construction with a predetermined length; the depth of the groove changes irregularly in each unit section; and one end of each unit section and the other end of the unit section are located in different positions in a circumferential direction around the central axis of the mold surface.

In an alternative embodiment, the spiral groove includes unit sections arranged adjacent to each other in the longitudinal direction, the unit sections having the same construction with a predetermined length; the depth of the groove changes irregularly in each unit section; and one end of each unit section and the other end of the unit section are located in different positions in a direction parallel to the longitudinal direction.

The groove of the mold may be designed to satisfy the following formula:

$$T/t = n + 0.4 \text{ or } T/t = n + 0.6$$

wherein t represents the pitch of a one spirally-extending groove along the central axis, T represents a distance between one end of each unit section of the groove and the other end of the unit section in a direction along the central axis, and n is a natural number, and wherein a left-hand side value is rounded off to one decimal place.

The present invention also provides a method for producing a mold for molding of an optical sheet having unit prisms, comprising the steps of: rotating a circular cylindrical or round columnar base material about its central axis, and moving a cutting tool in a direction intersecting the central axis and causing the cutting tool to cut into the base material; and then moving the cutting tool in a direction parallel to the central axis while rotating the base material about the central axis, thereby forming a spiral groove for a production of the unit prisms, wherein during the step of forming the groove, the cutting tool is also moved closer to and away from the central axis in a direction intersecting the central axis, and the movement speed of the cutting tool in the direction intersecting the central axis is changed in a stepwise manner.

The present invention also provides a light emitting device comprising: a light source; and the above-described optical sheet of the present invention which receives light from the light source.

In the light emitting device according to the present invention, the light source may include at least one light emitting diode, and the optical sheet may include a color temperature conversion layer for converting a color temperature of light emitted from the light emitting diode.

The light emitting device of the present invention may further comprise a light diffusing plate disposed on a light exit side of the optical sheet.

DETAILED DESCRIPTION OF THE INVENTION

Figure 1:
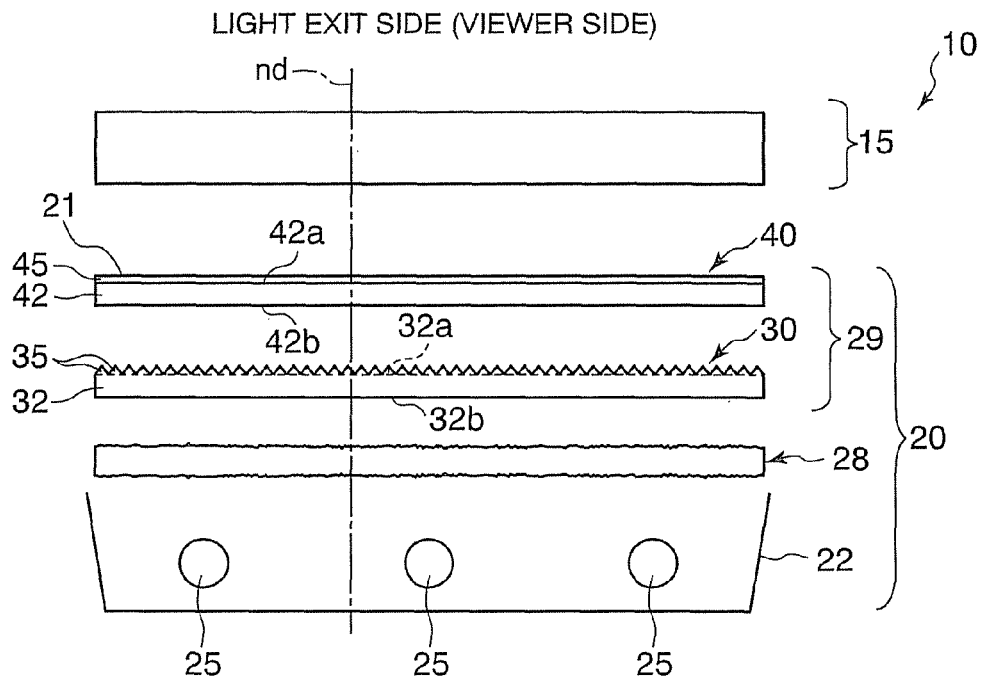
FIG. 1 is a cross-sectional view showing the schematic construction of a transmission type display device and a surface light source device according to one embodiment of the present invention.

Preferred embodiments of the present invention will now be described with reference to the drawings. In the drawings, for the sake of illustration and easier understanding, scales, horizontal to vertical dimensional ratios, etc. are exaggeratingly modified from those of the real things.

Figure 2:
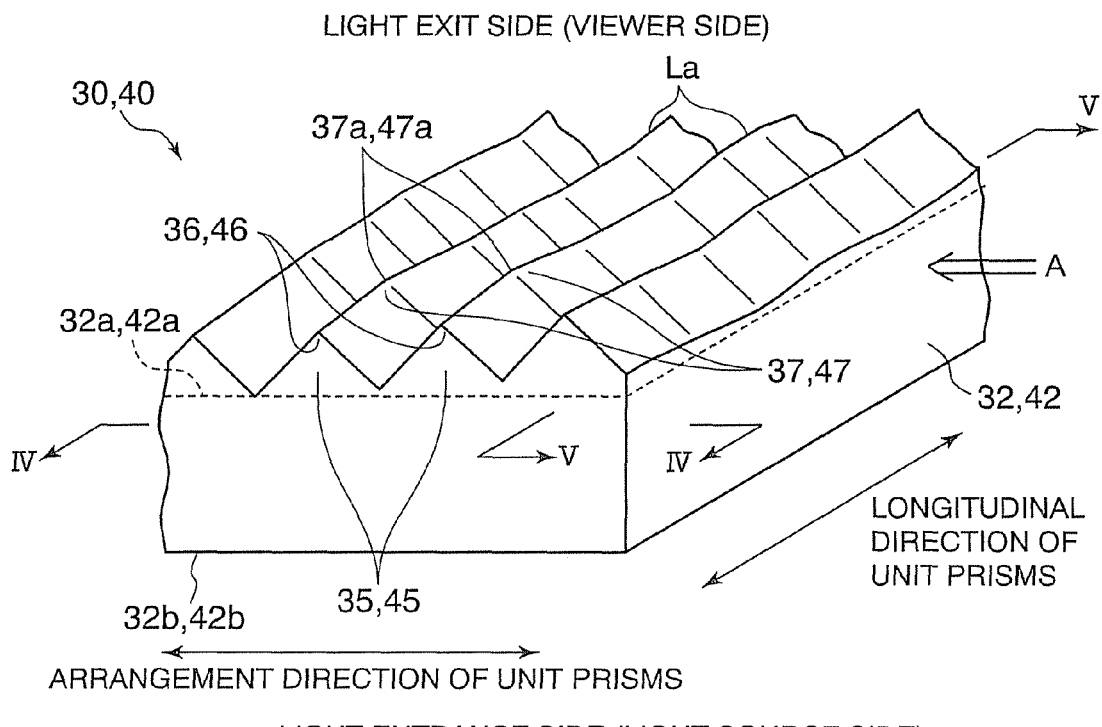
FIG. 2 is a perspective view of an optical sheet incorporated in the surface light source device of FIG. 1.
Figure 3:
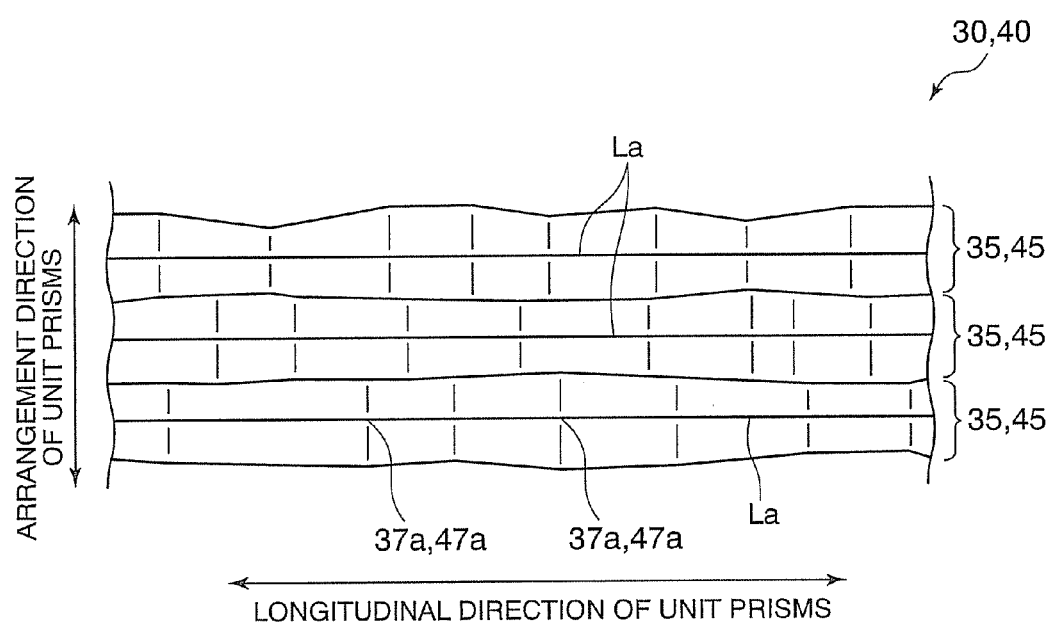
FIG. 3 is a top view of the optical sheet incorporated in the surface light source device of FIG. 1.
Figure 4:
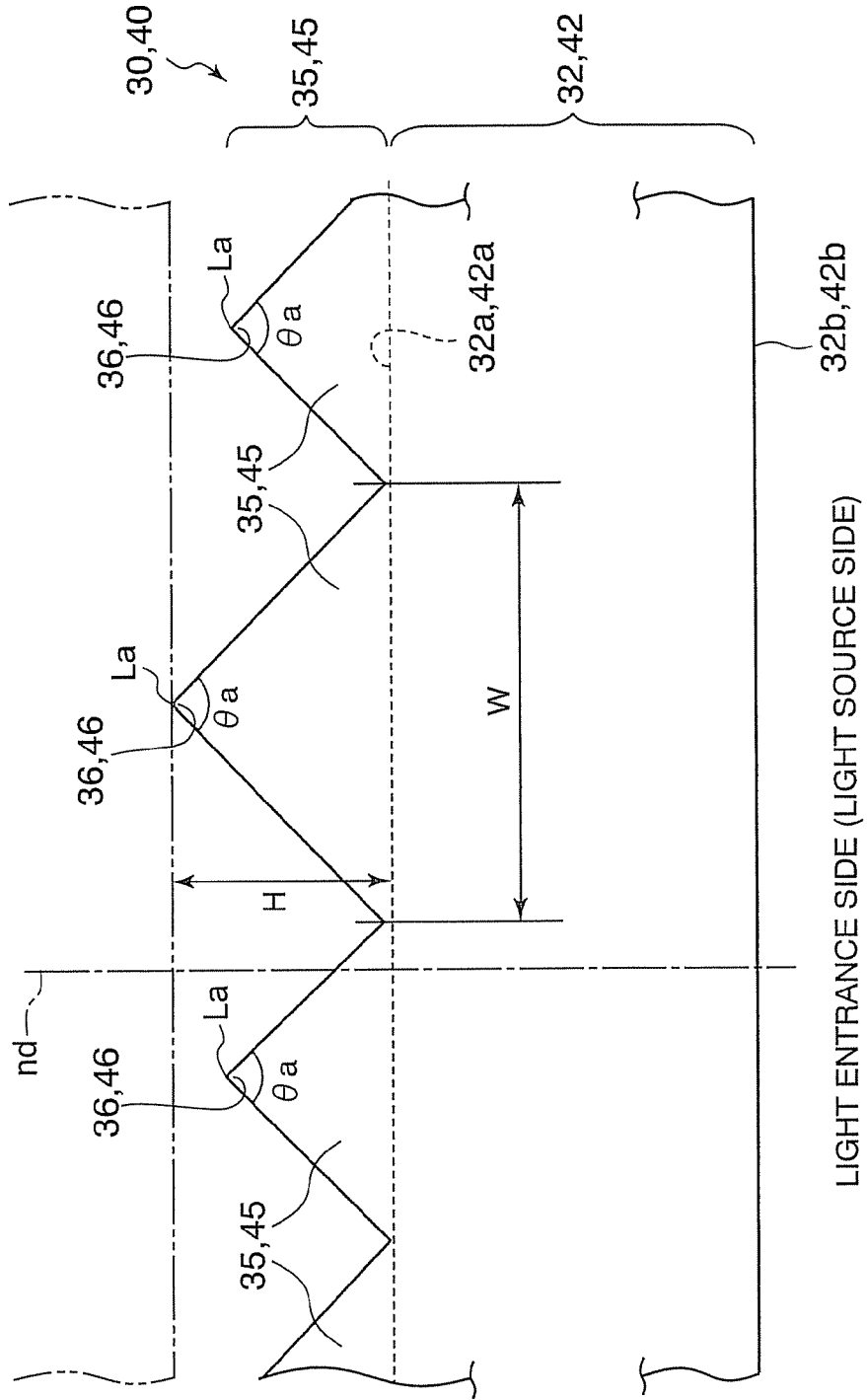
FIG. 4 is a cross-sectional view taken along the line IV-IV of FIG. 2.
Figure 5:
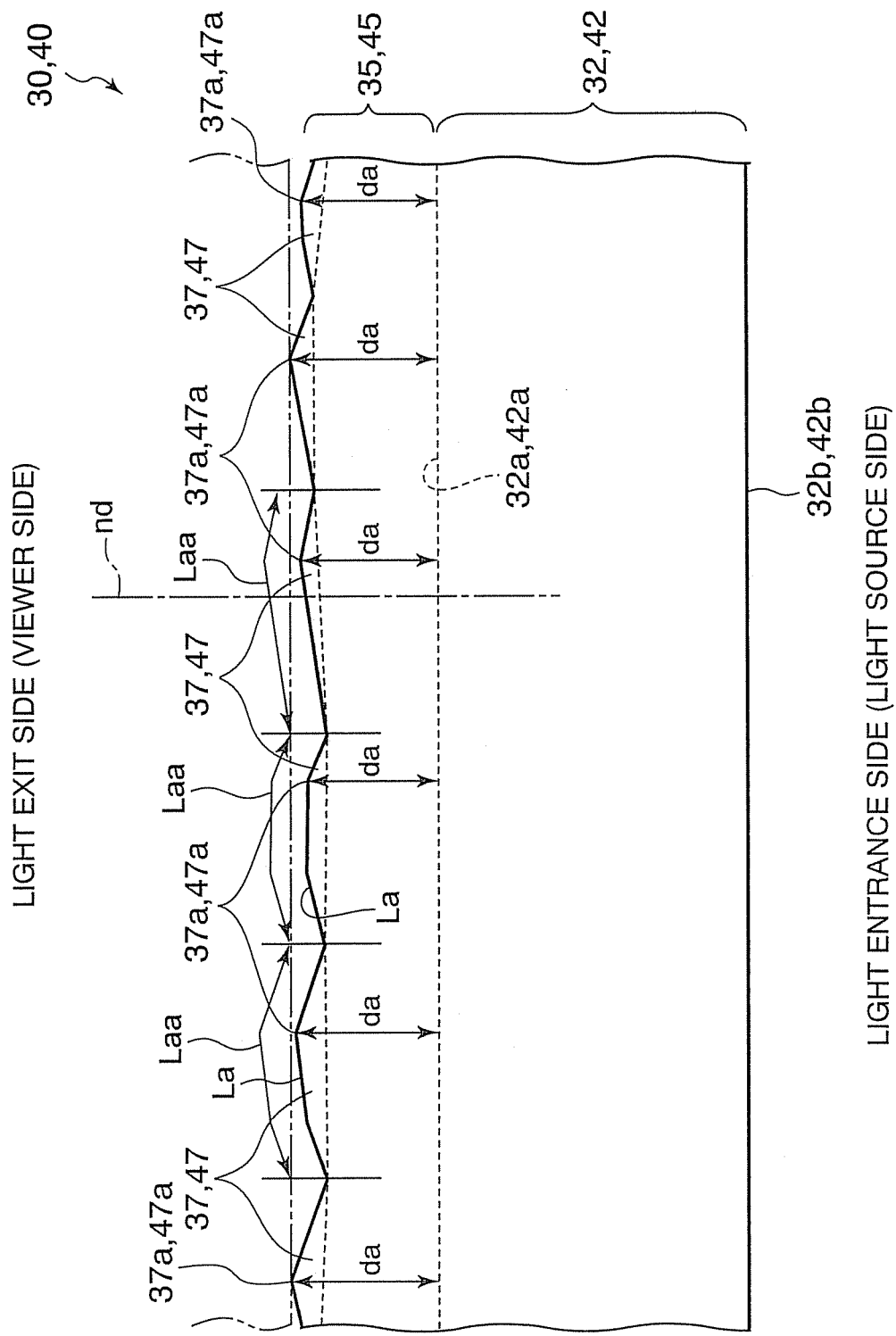
FIG. 5 is a cross-sectional view taken along the line V-V of FIG. 2.

FIGS. 1 through 12 are diagrams illustrating an embodiment of the present invention. Of these, FIG. 1 is a schematic cross-sectional view of a transmission type display device and a surface light source device; FIG. 2 is a perspective view of an optical sheet; FIG. 3 is a top view of the optical sheet; FIG. 4 is a cross-sectional view taken along the line IV-IV of FIG. 2; and FIG. 5 is a cross-sectional view takes along the line V-V of FIG. 2.

The transmission type display device 10 shown in FIG. 1 includes a transmission type display unit 15 and a surface light source device 20, disposed on the back side (the opposite side from a viewer or the light entrance side) of the transmission type display unit 15, for planarly illuminating the transmission type display unit 15 from the back. The transmission type display unit 15 is, for example, comprised of a liquid crystal display panel (LCD panel). In this case, the transmission type display device 10 functions as a liquid crystal display device. An LCD panel is a panel including a pair of support plates, e.g. made of glass, a liquid crystal disposed between the support plates, and an electrode for controlling the orientation of liquid crystal molecules by an electric field for each pixel region. The liquid crystal between the support plates is designed to be capable of changing the orientation for each pixel region. The transmission type display panel 15 thus functions as a shutter which controls transmission and blocking of light from the surface light source device 20 for each pixel to form an image.

In this embodiment the light entrance side surface (light incident side surface) of the transmission type display unit 15, facing the surface light source device 20, is a smooth surface and, in addition, no light diffusion sheet is interposed between the transmission type display unit 15 and an optical sheet 30. The term "smooth" herein refers to smoothness in an optical sense. In particular, the term refers to such a degree of smoothness that a certain proportion of visible light is refracted at the light entrance side surface of the transmission type display unit 15 in accordance with satisfying the Snell's law. Thus, the light entrance side surface of the transmission type display unit 15 will sufficiently meet the definition of "smooth" if the 10-point average roughness Rz (JIS B0601) of the surface is not more than the shortest visible light wavelength (0.38 μm).

The surface light source device 20 will now be described. As shown in FIG. 1, the surface light source device 20 includes a light source 25, a light diffusing sheet 28 for diffusing light, and a first optical sheet 30 and a second optical sheet 40 both for deflecting traveling direction of the transmitted light. As shown in FIG. 1, the light diffusing sheet 28 is located on the light entrance side of the first and second optical sheets 30, 40 and disposed opposite to the light source 25. The first optical sheet 30 is disposed between the light diffusing sheet 28 and the second optical sheet 40. The second optical sheet 40 is disposed on the outermost light exit side of the surface light source device 20 and constitutes a light emitting surface (light exit side surface) 21.

While the surface light source device 20 can be constructed in various forms such as, for example, an edge light (side light) type, the surface light source device 20 is constructed as a direct-type backlight unit in this embodiment. Thus, the light source 25 is disposed on the light entrance side of the light diffusion sheet 28 and the optical sheets 30, 40 such that it faces these sheets. Further, the light source 25 is covered from the back with a box-shaped reflective plate 22 having an opening (window) on the light diffusing sheet 28 side.

The term "light exit side" herein refers to downstream side (viewer side, and upper side in FIGS. 1, 2, 4 through 6) in the direction of light that travels from the light source 25 toward a viewer, passing through the optical sheets 30, 40, etc., without turning back. The term "light entrance side" herein refers to upstream side in the direction of light that travels from the light source 25 toward a viewer, passing through the optical sheets 30, 40, etc., without turning back.

The terms "sheet", "film" and "plate" are not used herein to strictly distinguish them from one another. Thus, for example, the term "sheet" includes a member which can also be called film or plate.

The term "sheet plane (film plane, plate plane)" herein refers to a plane which coincides with the planar direction of an objective sheet-like member when taking a wide and global view of the sheet-like member. In the case of an uneven surface, such as the surface composed of the unit prisms 35 shown in FIG. 2, the sheet plane of the uneven surface corresponds to the envelope plane of the uneven surface. In this embodiment the sheet planes of the optical sheets 30, 40, the sheet plane of the light diffusing sheet 28, the light emitting surface 21 of the surface light source device 20 and the display surface of the transmission type display device 10 are parallel to each other. The term "front direction" herein refers to the normal direction nd (see e.g. FIG. 4) of the sheet plane of the light emitting surface 21 of the surface light source device 20, and coincides with the normal direction of the display surface of the transmission type display device 10, the normal direction of the sheet planes of the optical sheets 30, 40, etc.

Figure 6:
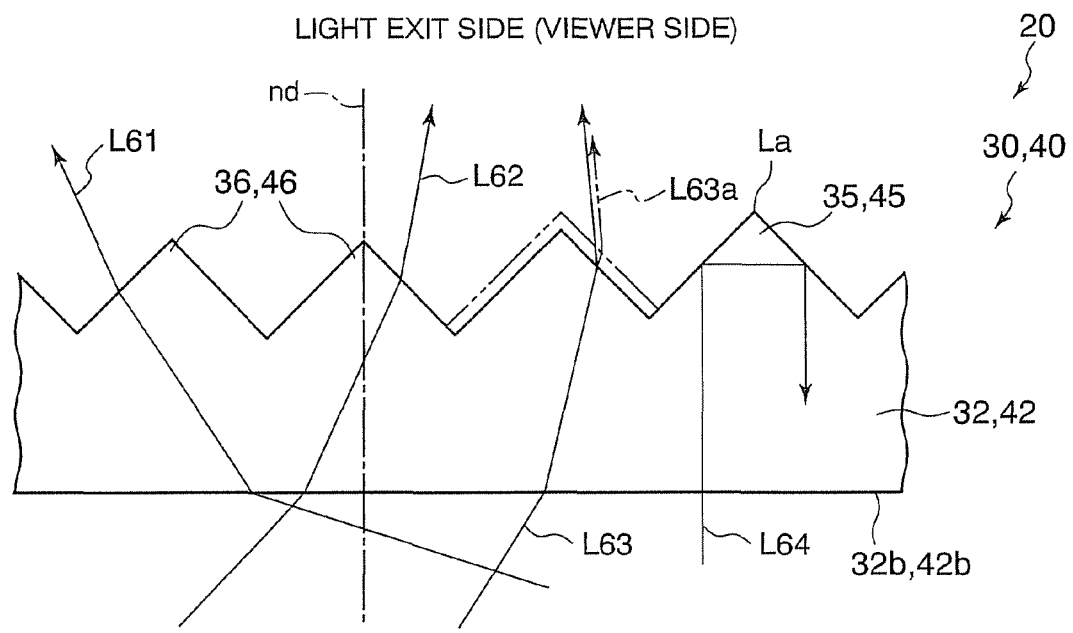
FIG. 6 is a diagram corresponding to FIG. 4, illustrating the action of the optical sheet of FIG. 2.

Various types of light emitting parts (light emitters), for example, a linear fluorescent tube such as a cold cathode fluorescent lamp, a point-like LED (light emitting diode) or incandescent bulb, a planar EL (electro luminescence) light emitter, etc. may be used for the light source 25. In this embodiment, as shown in FIGS. 1 and 6 (dashed-double dotted line), the light source 25 includes a plurality of linear cold cathode fluorescent lamps extending in the direction perpendicular to the plane of the paper of each figure. The reflective plate 22 is a member to direct light from the light source 25 toward the transmission type display unit 15. At least the inner surface of the reflective plate 22 is made of a material having a high reflectance, such as a metal.

The light diffusing sheet 28 is a sheet-like member for diffusing incident light, preferably diffusing incident light isotropically so as to reduce luminance variation (also called tube-derived contrast lines or light source image) due to the construction of the light source 25, and equalize the in-plane luminance distribution, thereby obscuring the image of the light source 25. For such a light diffusing sheet 28 may be used a sheet comprising a base and light diffusing particles dispersed in the base and having a light diffusing function. A light diffusing function can be imparted to the light diffusing sheet 28 e.g. by using light diffusing particles of a high-reflectance material, or by using light diffusing particles having a different refractive index from that of the base material. From the viewpoint of preventing adhesion to the light entrance side surface of the first optical sheet 30, the surface of the light diffusing sheet 28 is preferably roughened as shown in FIG. 1.

The first optical sheet 30 and the second optical sheet 40 will now be described. The first optical sheet 30 and the second optical sheet 40 mainly have a function (light condensing function, light collecting function) to change the travel direction of incident light in such a manner as to condense (collect) the exiting light into the front direction, thereby enhancing the luminance in the front direction intensively.

As shown in FIG. 2, the first optical sheet 30 includes a sheet-like body portion 32, and a large number of first unit prisms (first unit shaped elements, first unit optical elements) 35 arranged side by side in a direction (arrangement direction) parallel to the sheet plane of the body portion 32 and disposed on the light exit side surface (one surface) 32a of the body portion 32. Similarly, the second optical sheet 40 includes a sheet-like body portion 42, and a large number of second unit prisms (second unit shaped elements, second unit optical elements) 45 arranged side by side in a direction (arrangement direction) parallel to the sheet plane of the body portion 42 and disposed on the light exit side surface (one surface) 42a of the body portion 42. As described above, the second optical sheet 40 is disposed on the outermost light exit side of the surface light source device 20. Thus, the second unit prisms 45 of the second optical sheet 40 make contact with the light entrance side surface of the transmission type display unit 15. As shown in FIG. 1, the arrangement direction of the unit prisms 35 of the first optical sheet 30 intersects the arrangement direction of the unit prisms 45 of the second optical sheet 40. Further, the first optical sheet 30 and the second optical sheet 40 are superimposed on each other.

The term "prism" herein includes a prism in the narrow sense, having a cross-sectional contour composed of straight line segments, and a lens in the narrow sense, having a cross-sectional contour composed of a curved line segment(s), and also broadly includes a unit optical element having a cross-sectional contour composed of a straight line segment(s) and/or a curved line segment(s).

In this embodiment the first optical sheet 30 and the second optical sheet 40 can have the same construction in terms of the shape. That is to say, in this embodiment the body portion 32 of the first optical sheet 30 and the body portion 42 of the second optical sheet 40 can have the same shape. Further, in this embodiment the shape of the first unit prisms 35 of the first optical sheet 30 and the arrangement of the first unit prisms 35 can be the same as the shape of the second unit prisms 45 of the second optical sheet 40 and the arrangement of the second unit prisms 45, respectively. Furthermore, two optical sheets having the same construction, superimposed on each other such that the arrangement directions of their unit prisms intersect each other, can be used as the first optical sheet 30 and the second optical sheet 40.

In FIGS. 1 to 5, reference numerals in the 30s are used for the first optical sheet 30, while the same reference numerals but in the 40s are used for those portions of the second optical sheet 40 which can be the same in shape as the first optical sheet 30. When a description is given below by referring to numerals in both the 30s and 40s while omitting the words "first" and "second", the description is to be given of both the first optical sheet 30 and the second optical sheet 40. For example, the expression "unit prisms 35, 45" refers to both the first unit prisms 35 of the first optical sheet 30 and the second unit prisms 45 of the second optical sheet 40.

The body portion 32, 42 functions as a sheet-like member to support the unit prisms 35, 45. As shown in FIGS. 2 and 4, in this embodiment the unit prisms 35, 45 are arranged side by side with no space therebetween on one surface (light exit side surface in this embodiment) 32a, 42a of the body portion 32, 42. On the other hand, as shown in FIG. 5, in this embodiment the body portion 32, 42 has the other surface 32b, 42b opposite to the one surface 32a, 42a and which is a smooth surface and constitutes the light entrance side surface of the optical sheet 30, 40.

The unit prisms 35, 45 will now be described. As described above, the unit prisms 35, 45 are arranged side by side on the one surface 32a, 42a of the body portion 32, 42. As shown in FIGS. 2 and 3, each unit prism 35, 45 extends linearly, in particular in a straight line in this embodiment, in a direction intersecting the arrangement direction of the unit prisms 35, 45.

As well shown in FIG. 3, in this embodiment the large number of unit prisms 35, 45, contained in the optical sheet 30, 40, extends parallel to one other. When the optical sheet 30, 40 is viewed in the normal direction nd of the sheet plane of the body portion 32, 42, the longitudinal direction of the first unit prisms 35 of the first optical sheet 30 is parallel to the longitudinal direction of the light source 25, while the longitudinal direction of the second unit prisms 45 of the second optical sheet 40 is perpendicular to the longitudinal direction of the light source 25.

In this embodiment, when the optical sheet 30, 40 is viewed in the normal direction nd of the sheet plane of the body portion 32, 42 (i.e. when viewed in the front direction), each unit prism 35, 45, disposed on the surface 32a, 42a of the body portion 32, 42, extends from one edge to the opposite edge of the surface 32a, 42a. The display surface of the display device 10 generally has a rectangular shape in a planar view. Accordingly, the members constituting the display device 10, such as the transmission type display unit 15, the optical sheets 30, 40 and the light diffusing sheet 28, also typically have a rectangular shape in a planar view. When the surface 32a, 42a of the body portion 32, 42 has a rectangular shape, the unit prisms 35, 45 may extend linearly between a pair of sides of the surface 32a, 42a positioned opposed to each other.

FIG. 4 shows the optical sheet 30, 40 in a cross-section which is parallel to both the normal direction nd of the sheet plane of the body portion 32, 42 and the arrangement direction of the unit prisms 35, 45 (also referred to as the main cross-section of the optical sheet). The cross-section shown in FIG. 4 corresponds to the cross-section taken along the line IV-IV of FIG. 2.

In this embodiment the cross-sectional shape of each unit prism 35, 45 in the main cross-section is approximately constant along the longitudinal direction of the prism 35, 45. In particular, each unit prism 35, 45 is generally comprised of columnar segments. As well shown in FIG. 2, the direction in which the columnar segment extends varies among the columnar segments along the longitudinal direction of the prism 35, 45. Thus, each unit prism 35, 45 is generally comprised of the columnar segments having approximately the same cross-sectional shape, extending in various directions and connected in a line in a top view. Thus, each prism 35, 45, when viewed in a direction parallel to the arrangement direction of the unit prisms 35, 45, has an uneven polygonal line-shaped contour as shown in FIG. 5.

As shown in FIG. 4, in this embodiment each prism 35, 45 has a generally triangular cross-sectional shape, projecting toward the light exit side, in the main cross-section. In particular, from the viewpoint of intensively enhancing the front direction luminance, each unit prism 35, 45 is constructed such that the cross-sectional shape in the main cross-section is an isosceles triangle in which the apex between the two equal sides projects from the surface 32a, 42a of the body portion 35, 45 toward the light exit side. Typically, the cross-sectional shape of each unit prism 35, 45 in the main cross-section is an isosceles right triangle in which the right-angled apex projects from the body portion 35, 45 and which is symmetrical with respect to an axis of symmetry extending in the front direction. Thus, each unit prism 35, 45 is generally comprised of triangular prism segments connected to each other and extending along various directions at slightly different angles with respect to the surface 32a, 42a of the body portion 32, 42 in a plane perpendicular to the surface 32a, 42a of the body portion 32, 42.

In the optical sheet 30, 40 illustrated in the figures, due to the below-described production method, the height-direction position of the deepest point in the valley formed between two adjacent unit prisms 35, 45 is not constant but varies. Thus, the cross-sectional shape of each unit prism 35, 45 in the main cross-section is an isosceles right triangle for the most part of the cross-sectional area, including the apex and excluding an area in the vicinity of the interface between the unit prism and the body portion 32, 42. Thus, to be precise, the cross-sectional shape of each unit prism 35, 45 in the main cross-section includes an isosceles right triangle in the major area including the apex.

Because the cross-sectional shape of each unit prism 35, 45 in the main cross-section of the optical sheet is generally triangular, each prism unit 35, 45 has a ridge line La as shown in FIG. 2. The ridge line La is a line made by continuously connecting the apices 36, 46, the farthest points from the body portion 32, 42, of the continuous cross-sectional shapes of each prism unit 35, 45 in the main cross-section of the optical sheet. In a top view (as viewed from the front), each ridge line La extends parallel to the longitudinal direction (extending direction) of the unit prism 35, 45 in this embodiment as shown in FIG. 3. Further, as well shown in FIG. 3, when viewed in the normal direction of the body portion 32, 42, the ridge lines La defined by the large number of unit prisms 35, 45, contained in the optical sheet 30, 40, extend linearly parallel to one another.

The term "triangular shape" herein includes not only a triangular shape in the strict sense but also a generally triangular shape that may reflect limitations in production technique, a molding error, etc., and a generally triangular shape from which the same optical effect as a triangular shape can be expected. For instance, the "triangular shape" includes a triangle with a rounded apex. Similarly, the term "polygonal line" or "polygonal-line" herein includes not only a polygonal line in the strict sense but also a polygonal line-like shape that may reflect limitations in production technique, a molding error, etc. In particular, in a polygonal line composed of line segments having different directions, the line segments need not necessarily be straight line segments, but may be curved, e.g. due to limitations in production technique or a molding error, to such an extent that the below-described optical function can be expected. Further, in a polygonal line composed of line segments having different directions, connection points between adjacent segments may be rounded, e.g. due to limitations in production technique or a molding error, to such an extent that the below-described optical function can be expected. The terms used herein to specify shapes or geometric conditions, such as "parallel", "perpendicular", "symmetrical", etc., should not be bound to their strict sense, and should be construed to include equivalents or resemblances from which the same optical function or effect can be expected.

FIG. 5 shows the optical sheet 30, 40 in a cross-section parallel to both the normal direction nd of the sheet plane of the body portion 32, 42 and the ridge line direction of the unit prisms 35, 45 and containing the ridge line of a unit prism 35, 45. The cross-section shown in FIG. 5 corresponds to the cross-section taken along the line V-V of FIG. 2. In the cross-section shown in FIG. 5, the ridge line La is an uneven polygonal line. As described above, in this embodiment the ridge line La extends parallel to the longitudinal direction of the unit prism 30, 40 in a top view of the optical sheet 30, 40. In such embodiment, when the unit prism 30, 40 is viewed in a direction (e.g. the direction of arrow A shown in FIG. 2) parallel to the arrangement direction of the unit prisms 30, 40, the line of the line segments connecting the consecutive vertices of the polygonal line-shaped contour of the unit prism 30, 40 in the direction perpendicular to the main cross-section, coincides with the ridge line La.

As shown in FIG. 5, raised portions 37, 47 are defined by the uneven polygonal line La in the unit prism 35, 45. More specifically, a top 37a, 47a is defined as the connection point between adjacent two line segments having different directions of inclination with respect to the normal direction of the sheet plane of the body portion 32, 42, more precisely as the connection point between a rightward ascending line segment in FIG. 5 and a leftward ascending line segment in FIG. 5, joining to the right end of the rightward ascending line segment. A raised portion 37, 47 is defined by a polygonal line section (group of consecutive line segments) Laa composed of one rightward ascending line segment or two or more consecutive rightward ascending line segments and one leftward ascending line segment or two or more consecutive leftward ascending line segments, joining to the right end of the one or two or more rightward ascending line segments, and more strictly defined as a polygonal area surrounded by the polygonal line section Laa and an imaginary line (dotted line shown in FIG. 5) connecting both ends of the polygonal line section Laa.

As shown in FIG. 5, the thus-defined raised portions 37, 47 each have a polygonal shape, such as a triangular or quadrangular shape. For each raised portion 37, 47, a top 37a, 47a, the farthest point from the base portion 32, 42 in the raise portion, is defined as a point or a line. The optical sheet 30, 40 makes contact with an adjacent member, such as the light entrance side surface of the transmission type display unit 15, at the tops 37a, 47a of the raised portions 37, 47 of the optical sheet 30, 40.

As shown in FIG. 5, with reference to the raised portions 37, 47 contained in each unit prism 35, 45, the distance (height) da between the top 37a, 47a of each raised portion 37, 47, the farthest point from the body portion 32, 42 in the raised portion, and the light exit side surface (light outgoing side surface) 32a, 42a of the body portion 32, 42 in the normal direction of the body portion 32, 42 is not constant but varies. Thus, the heights da of the raised portions 37, 47 of the unit prism 35, 45 from the body portion 32, 42 are not constant.

With reference to any two raised portions 37, 47, adjacent to each other in the longitudinal direction of the unit prism 35, 45, of the raised portions 37, 47 contained in the unit prism 35, 45, the heights da of the two tops 37a, 47a from the body portion 32, 42 are preferably different from each other from the viewpoint of preventing problems due to contact between the optical sheet 30, 40 and an adjacent member. More preferably, with reference to the raised portions 37, 47 contained in each unit prism 35, 45, the heights da of the tops 37a, 47a from the body portion 32, 42 are all different from one another.

Further, as shown in FIG. 3, it is preferred that the tops 37a, 47a of the raised portions 37, 47 contained in any one unit prism 35, 45 and the tops 37a, 47a of the raised portions 37, 47 contained in a unit prism 35, 45 adjacent to the one unit prism 35, 45 be not located in the same position in the longitudinal direction of the unit prisms 35, 45. Thus, the tops 37a, 47a of the raised portions 37, 47 contained in any adjacent two unit prisms preferably are not located side by side in the arrangement direction of the unit prisms 35, 45. Such arrangement can prevent contact between the tops 37a, 47a of the raised portions 37, 47 of the optical sheet 30, 40 and another member disposed adjacent to the optical sheet 30, 40 from being noticeable to a viewer of the transmission type display device 10.

With reference to the unit prisms 35, 45 having the above construction, the width W (see FIG. 4) of the bottom of each prism 35, 45 on the surface 32a, 42a of the body portion 32, 42 in the arrangement direction of the unit prisms 35, 45 may be, for example, 10 μm to 500 um. The height H (see FIG. 4) of each unit prism 35, 45 from the surface 32a, 42a of the body portion 32, 42 in the normal direction nd of the sheet plane of the optical sheet 30, 40 may be, for example, 5 μm to 250 um. When the cross-sectional shape of each unit prism 35, 45 is an isosceles triangle, the apex angle θa (see FIG. 4) at the apex lying between the equal sides is preferably not less than 80° and not more than 110°, and more preferably 90° from the viewpoint of intensively enhancing the front direction luminance.

The pitch of the raised portions 37, 47 in the longitudinal direction of the unit prisms 30, 40 may be appropriately designed taking account of limitations in the production method used, effective prevention of the occurrence of problems due to contact of the optical sheet 30, 40 with an adjacent member, etc., and may be, for example, not less than 70 mm and not more than 900 mm. Similarly, the amplitude of the ridge line La in the normal direction of the body portion 32, 42 may be appropriately designed taking account of limitations in the production method used, effective prevention of the occurrence of problems due to contact of the optical sheet 30, 40 with an adjacent member, etc., and may be, for example, not less than 1 μm and not more than 10 μm.

Figure 7:
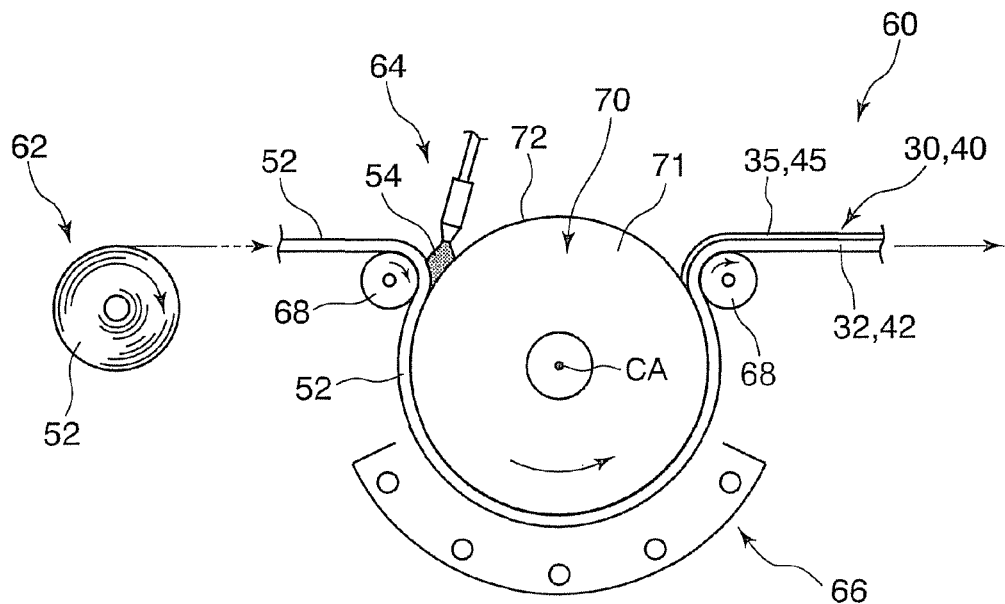
FIG. 7 is a schematic diagram illustrating an optical sheet production method and an optical sheet molding apparatus.

An exemplary method for the production of the optical sheet 30, 40 having the above construction will now be described. The following description illustrates a method for producing the optical sheet 30, 40, in which the optical sheet 30, 40 is made by forming the unit prisms 35, 45 on a sheet material 52 by means of a molding method using a molding apparatus 60 as shown in FIG. 7.

The molding apparatus 60 will be described first. As shown in FIG. 7, the molding apparatus 60 includes a mold 70 having a generally round columnar contour (circular cylindrical contour). The round columnar mold 70 has, in its portion corresponding to the outer peripheral surface (side surface), a circular cylindrical mold surface (uneven surface) 72. The mold 70 having the shape of a round column has a central axis CA passing through the center of the peripheral surface of the round column, in other words, centrally passing through the cross-section of the round column. The mold 70 is constructed as a roll shaped mold which, while rotating on the central axis CA as the axis of rotation (see FIG. 7), molds the optical sheet 30, 40 as a molded product.

Figure 8A:
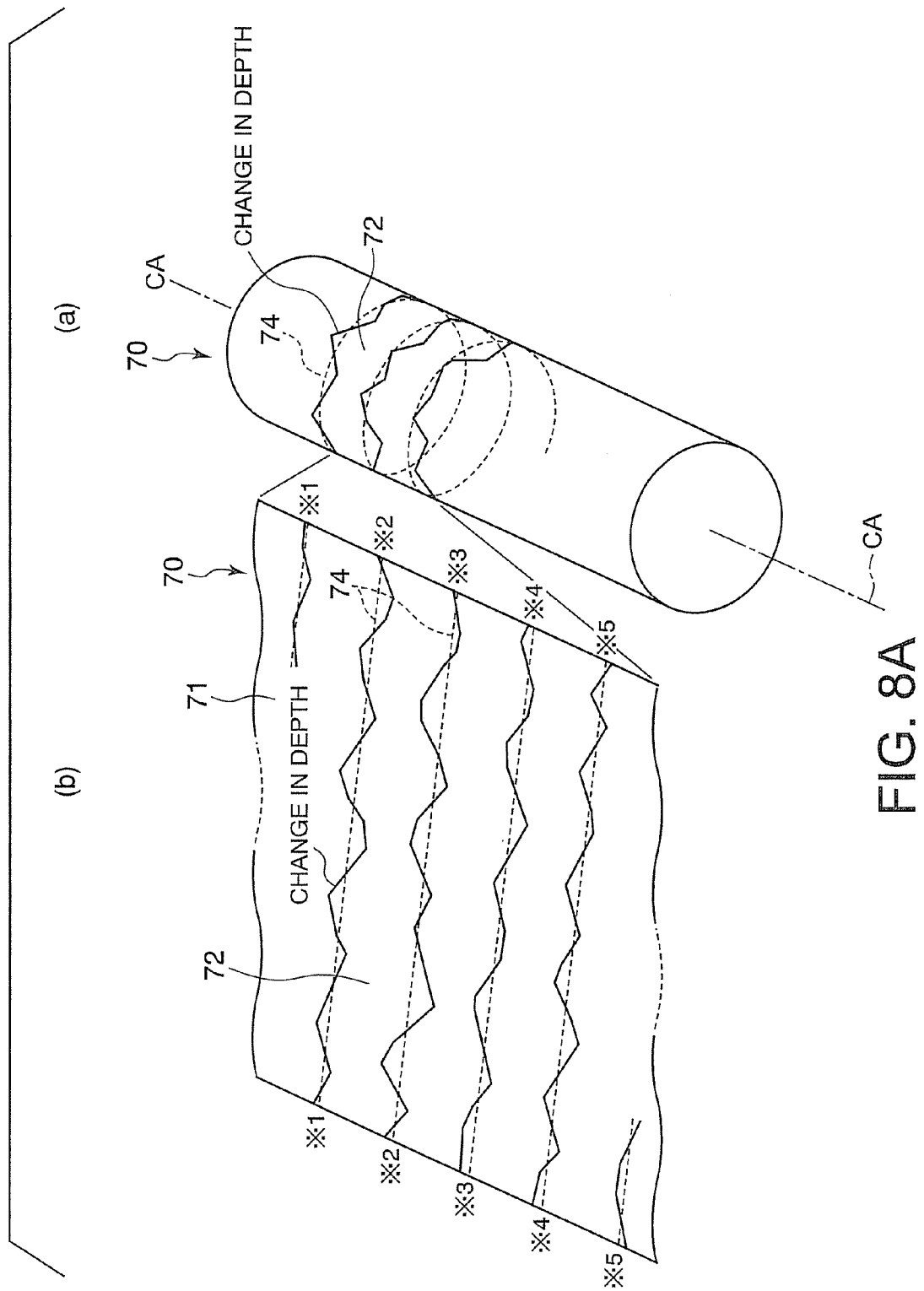
FIG. 8A is a diagram for explaining a mold incorporated in the molding apparatus of FIG. 7.
Figure 9A:
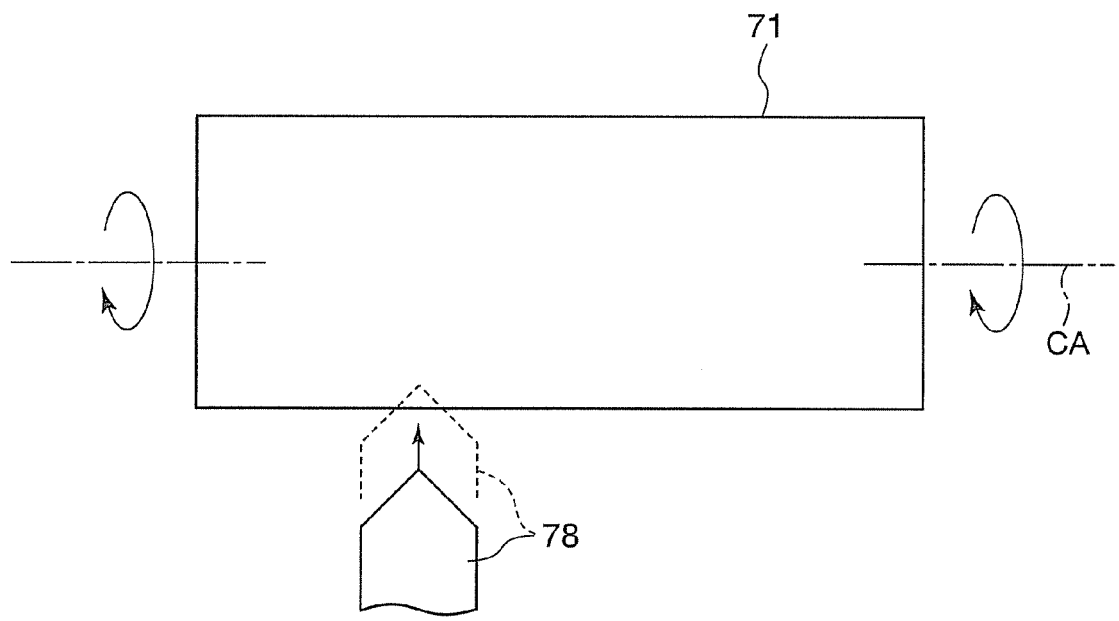
FIG. 9A is a diagram for explaining a method for producing the mold incorporated in the molding apparatus of FIG. 7.
Figure 9B:
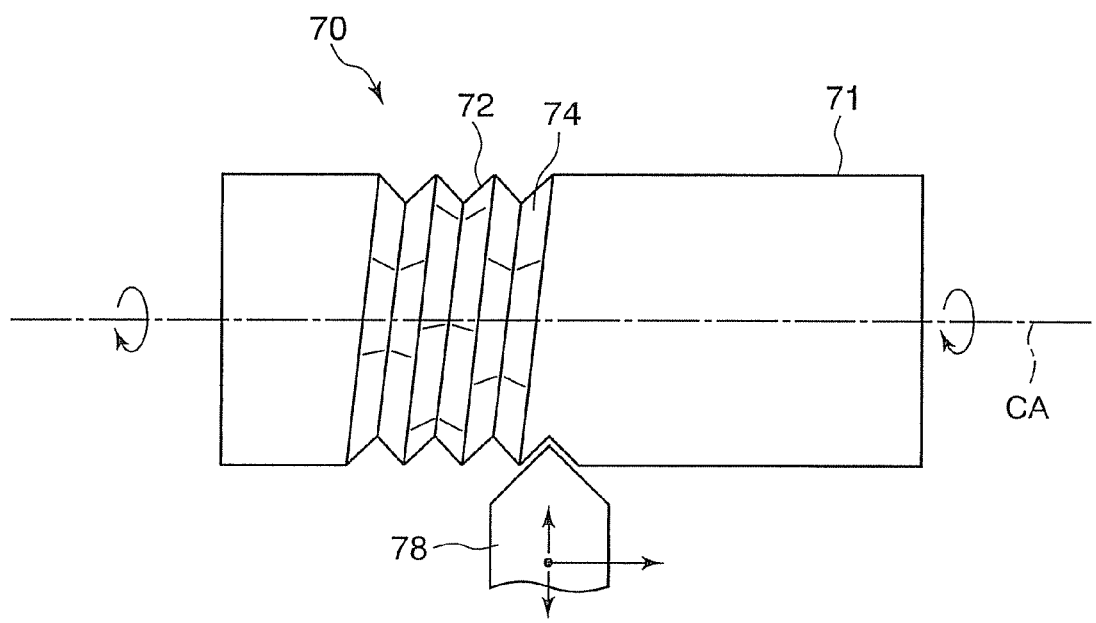
FIG. 9B is a diagram illustrating a method for producing the mold incorporated in the molding apparatus of FIG. 7.

As shown in FIGS. 9B and 10(a), the mold surface 72 has a groove 74 for shaping the unit prisms 35, 45 of the optical sheet 30, 40. In FIG. 8A, the route of the groove 74 is shown by the dotted lines and change in the depth of the groove 74 along the longitudinal direction is shown by the solid lines. FIG. 8A(a) is a perspective view schematically showing the mold; and FIG. 8A(b) is an imaginary perspective view of the mold surface 72, obtained by developing the circular cylindrical mold surface 72 into a planar surface. As shown in FIG. 8A(a), the groove 74 is formed in the mold surface 72 such that it makes a spiral around the central axis CA of the mold surface 72. Thus, in FIG. 8A(b), the right end of one line segment showing the route of the groove 74 connects with the left end of the line segment just under and adjacent to the one line segment. As shown in FIG. 8A(b), the depth of the groove 74 changes in an uneven polygonal line pattern along the longitudinal direction of the groove 74.

The depth of the groove 74 preferably changes irregularly over the full length of the groove 74. In view of easiness of the production of the mold 70, however, instead of irregularly changing the depth of the groove 74 over the full length, it is possible to repeatedly provide a unit section (unit division) in which the depth of the groove 74 changes irregularly, thereby determining the depth of the groove 74 over the full length. In this case, the groove 74 can be formed quickly and easily by machining when producing the mold 70 for the production of the optical sheet 30, 40.

With reference to the groove 74 formed by repeatedly providing a unit section (unit division) in which the depth of the groove 74 changes irregularly, the change of the depth has a periodicity. The change in the depth of the groove 74 coincides with the change in the ridge lines La of the unit prisms 35, 45 of the optical sheet 30, 40, produced by using the mold 70, as will be described later. If the height change of the unit prisms 35, 45 of the resulting optical sheet 30, 40 has a high regularity, a visible pattern (e.g. stripe pattern) is likely to appear on the surface of the optical sheet 30, 40 even if problems due to contact of the optical sheet 30, 40 with another member can be reduced. The pattern may be visible even to a viewer of the display device 10.

To solve the problem, the unit section (unit division) in which the depth of the groove 74 changes irregularly is preferably set long. This can reduce the periodicity of the depth change of the groove 74, thereby preventing the occurrence of the problem.

Figure 8B:
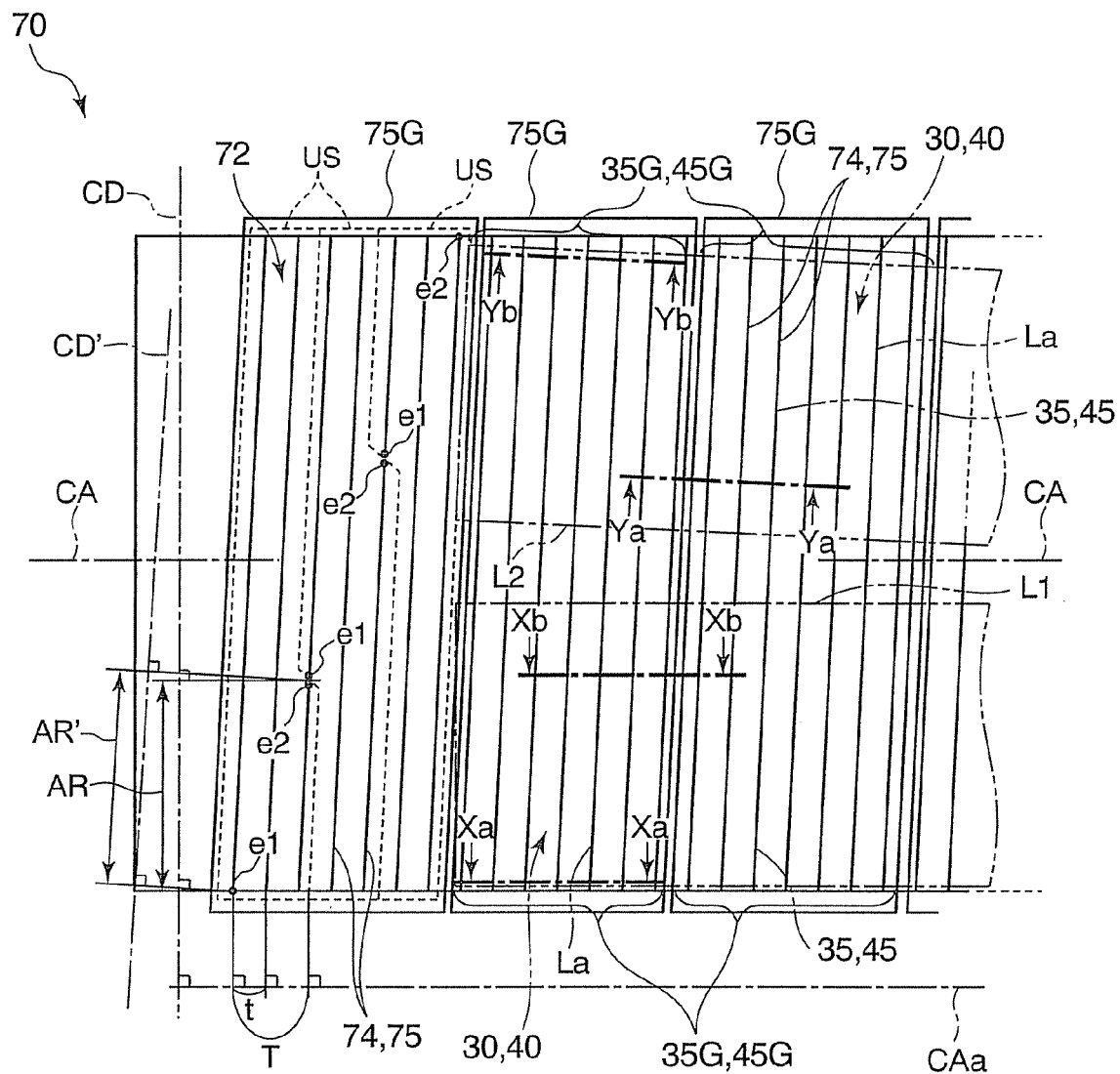
FIG. 8B is a development view for explaining a construction of the mold surface of the mold of FIG. 8A, obtained by developing the mold surface along the circumferential direction into a planar surface.

Further, in order to reduce the periodicity of the depth change of the groove 74, it is preferred to set the length of the unit section (unit division) US, in which the depth of the groove 74 changes irregularly, such that it is not approximately equal to a natural-number multiple of the circumferential length of the outer peripheral surface (circumferential surface) constituting the mold surface 72, as shown in FIG. 8B. According to this embodiment, even when the length of the unit section (unit division) in which the depth of the groove 74 changes irregularly is not sufficiently long, for instance, even when the unit section, contained in the groove 74 which revolves a large number of times around the central axis CA in a spiral manner, only revolves a few number of times around the central axis CA, the periodicity of the depth change of the groove 74 can be reduced to prevent the occurrence of the problem.

FIG. 8B is an imaginary development view of the mold surface 72, obtained by developing the original cylindrical surface 72 along the circumferential direction into a planar surface. In FIG. 8B, the deepest portion of the groove 74, corresponding to the ridge lines La of the prisms 35, 45 molded, is shown by the solid lines. In the embodiment shown in FIG. 8B, the surface irregularities of the mold surface 72 are formed by the groove 74 extending spirally. The spiral groove 74 is divided into a large number of segments 75 in FIG. 8B which shows the circumferentially-developed planar view of the mold surface 72, and the groove segments 75 of the groove 74 are parallel to each other in FIG. 8B. Because the groove 74 extends spirally around the central axis CA, the groove 74 is slightly inclined with respect to the circumferential direction CD of the mold 70, which is perpendicular to the central axis CA, as shown in FIG. 8B.

In the embodiment shown in FIG. 8B, the spirally extending groove 74 contains a plurality of unit sections US (each section is part of the groove 74 and extends in the range surrounded by dotted lines in FIG. 8B). The unit sections US are arranged adjacent to each other in the longitudinal direction. The unit sections US have the same construction (i.e. the depth changes in the same manner) and the same predetermined length. The depth of the groove 74 changes irregularly in each unit section US over the full length of the unit section US.

In the illustrated embodiment, one end e1 of each unit section US and the other end e2 of the unit section US are located in different positions in the circumferential direction CD around the central axis CA (see the arrow AR of FIG. 8B) of the mold surface 72. That is to say, the following formula holds: $T/t \neq n$, wherein t represents the pitch of the one groove 75 on the mold surface 72 along the central axis CA, T represents the distance between one end e1 of each unit section US of the groove 74 and the other end e2 of the unit section US in a direction CAa which is on the mold surface 72 and is parallel to the central axis CA, and n is a natural number. According to the mold surface 72 having the thus designed groove 74, in the optical sheet 30, 40 obtained by transferring the surface irregularities of the mold surface 72 such that a pair of opposing sides of the rectangular contour of the optical sheet 30, 40 is parallel to the central axis CA of the mold surface 72 as shown by the dashed-double dotted line L1 in FIG. 8B, unit prisms 35, 45 with the same height change can be prevented from being disposed near each other. This can reduce the regularity of the height change of the unit prisms 35, 45 in the optical sheet 30, 40 produced, thereby preventing a stripe pattern from appearing on the surface of the optical sheet 30, 40.

In addition, in the embodiment shown in FIG. 8B, one end e1 of each unit section US and the other end e2 of the unit section US are located in different positions in a direction CD' parallel to the longitudinal direction of the groove 74 (see the arrow AR' of FIG. 8B). According to the mold surface 72 having the thus designed groove 74, in the optical sheet 30, 40 obtained by transferring the surface irregularities of the mold surface 72 such that a pair of opposing sides of the rectangular contour of the optical sheet 30, 40 is parallel to the longitudinal direction of the groove 74 as shown by the dashed-double dotted line L2 in FIG. 8B, unit prisms 35, 45 with the same height change can be prevented from being disposed near each other. This can reduce the regularity of the height change of the unit prisms 35, 45 in the optical sheet 30, 40 produced, thereby preventing a stripe pattern from appearing on the surface of the optical sheet 30, 40.

Even though one end e1 of each unit section US and the other end e2 of the unit section US are located in different positions in the circumferential direction CD around the central axis CA of the mold surface 72, when the number of revolutions of the spiral groove 74 is large, the starting end e1 of one unit section US and the starting end e1 of some other unit section US, located at a distance from the one unit section US in the direction of the central axis CA, are to be located in the same position in the circumferential direction CD. As a result, in the development view of the mold surface 72, shown in FIG. 8B, groove segments (groove fragments) 75 having the same depth change are to be disposed at the same position in the circumferential direction CD with a certain number of groove segments 75 interposed therebetween. Further, in the development view of the mold surface 72, shown in FIG. 8B, a plurality of groove segment groups 75G, each composed of at least two consecutive groove segments 75, are to be arranged consecutively and side by side. The groove segment groups 75G all have the same construction (the arrangement of groove segments, the depth change of each groove segment, etc.). More specifically, of the at least two groove segments 75 contained in each groove segment group 75G and arranged side by side along the central axis CA, an "n"th groove segment 75 from one side along the central direction CD (n is a natural number not more than the number of the groove segments 75 contained in one groove segment group 75G) has the same construction (depth change, etc.) for all the groove segment groups 75G. There are no two groove segments 75, both having the same construction over the full length, in one groove segment group 75G; the constructions (depth change, etc.) of the groove segments 75 contained in one groove segment group 75G are different from one another.

Accordingly, the unit prisms 35, 45 of the optical sheet 30, 40, formed by transferring such surface irregularities of the mold surface 72, are composed of a plurality of unit prism groups 35G, 45G arranged consecutively and side by side in the arrangement direction of the unit prisms 35, 45, corresponding to the groove segment groups 75G arranged consecutively and side by side in the arrangement direction of the groove segments 75. Each unit prism group 35G, 45G is composed of at least two unit prisms 35, 45, and the unit prism groups 35G, 45G all have the same construction. Thus, of the unit prisms 35, 45 contained in each unit prism group 35G, 45G and arranged side by side, an "n"th unit prism 35, 45 from one side along the arrangement direction of the unit prisms (n is a natural number not more than the number of the unit prisms 35, 45 contained in one unit prism group 35G, 45G) has the same construction (depth change, etc.) for all the unit prism groups 35G, 45G. The two or more unit prisms 35, 45, contained in each unit prism group 35G, 45G, have different constructions, i.e. different height change patterns, from one another.

In the embodiment shown in FIG. 8B, the position of one end e1 of each unit section US differs from the position of the other end e2 of the unit section US in the circumferential direction CD by a length equal to one third of the circumference, with the central axis CA as a center, of the mold surface 72 as a center. Accordingly, the same position of starting end e1 in the circumferential direction CD repeats every three unit sections US. Each groove segment group 75G is composed of three unit sections US and contains seven groove sections 75. Consequently, in the optical sheet 30, 40 formed by using the mold 70 shown in FIG. 8B, each unit prism group 35G, 45G contains seven unit prisms 35, 45 which have different height change patterns from one another. Further, in the optical sheet 30, 40, the same height change pattern of unit prism 35, 45 repeats every seven unit prisms 35, 45.

In the mold surface of the mold 70, each groove segment group 75G is comprised of a set of unit sections US having the same depth change pattern. Therefore, the cross-sectional shape of the mold surface 72, in a cross-section along the arrangement direction of the groove segments 75 and at one position in the circumferential direction is identical to that at a certain position at a distance from the one position in the circumferential direction. For example, the cross-sectional shape along the line Xa-Xa in FIG. 8B at the starting end e1 of a unit section US is identical to the cross-sectional shape along the line Xb-Xb in FIG. 8B at the starting end e1 of another unit section US. In other words, in a cross-section (main cross-section of the mold surface) along both the arrangement direction of the groove segments 75 and the normal direction of the mold surface 72, the cross-sectional shape, at one position in the circumferential direction CD, of the at least two groove segments 75 contained in one groove segment group 75G is identical to the cross-sectional shape, at a certain position at a distance from the one position in the circumferential direction CD, of groove segments 75 the number of which is the same as the number of the at least two groove segments and which are arranged side by side in an area spanning both the one groove segment group 75G and another groove segment group 75G adjacent to the one groove segment group 75G.

Consequently, in the optical sheet 30, 40 produced by using such mold 70, the cross-sectional shape in the main cross-section, at one position in the longitudinal direction of the unit prisms 35, 45, of the at least two unit prisms 35, 45 contained in one unit prism group 35G, 45G is identical to the cross-sectional shape in the main cross-section, at a certain position at a distance from the one position in the longitudinal direction of the unit prisms 35, 45, of unit prisms 35, 45 the number of which is the same as the number of the at least two unit prisms and which are arranged side by side in an area spanning both the one unit prism group 35G, 45G and another unit prism group 35G, 45G adjacent to the one unit prism group 35G, 45G.

For example, in the optical sheet 30, 40 obtained by transferring the surface irregularities of the mold surface 72 such that a pair of opposing sides of the rectangular contour of the optical sheet 30, 40 is parallel to the central axis CA of the mold surface 72 as shown by the dashed-double dotted line L1 in FIG. 8B, the cross-sectional shape in the main cross-section along a line corresponding to the line Xa-Xa is identical to cross-sectional shape in the main cross-section along a line corresponding to the line Xb-Xb. In the optical sheet 30, 40 obtained by transferring the surface irregularities of the mold surface 72 such that a pair of opposing sides of the rectangular contour of the optical sheet 30, 40 is parallel to the longitudinal direction of the groove 74 as shown by the dashed-double dotted line L2 in FIG. 8B, the cross-sectional shape in the main cross-section along a line corresponding to the line Ya-Ya is identical to cross-sectional shape in the main cross-section along a line corresponding to the line Yb-Yb.

According to the above-described embodiment, the unit construction (depth change) of the groove 74 is determined over the full length of the unit section US, and the overall construction (depth change) of the groove 74 over the full length of the groove is determined by consecutively arranging the unit sections US. This method can very easily design and produce the groove 74, or the mold surface 72 of the mold 70 compared to the method of determining the construction of a groove in such a manner that the depth of the groove changes irregularly over the full length of the groove. This method can therefore significantly lower the production cost of the mold 70 and the optical sheet 30, 40 produced by using the mold 70.

Further, in the above-described embodiment, one end e1 of each unit section US and the other end e2 of the unit section US are located in different positions in the circumferential direction CD around the central axis CA of the mold surface 72. Alternatively, one end e1 of each unit section US and the other end e2 of the unit section US are located in different positions in a direction parallel to the longitudinal direction of the unit prisms 35, 45. According to this embodiment, the regularity of the depth of the groove 74 in the mold surface 72 can be effectively reduced even when the length of each unit section US, having an irregular depth change pattern, is made short. This can effectively reduce the regularity of the unit prisms 35, 45 formed by using the mold surface 72. It thus becomes possible to produce the useful optical sheet 30, 40, which can effectively reduce problems due to contact with another member as described later, while effectively lowering the production cost by imparting regularity to the height change pattern of the unit prisms 35, 45. It also becomes possible to effectively reduce the problem of a stripe pattern appearing on the surface of the optical sheet 30, 40 due to the regularity of the depth change pattern of the unit prisms 35, 45.

It has been found through the present inventors' experiments that the groove 74 of the mold 70, if designed to satisfy either one of the following formulae, can effectively reduce the problem of a stripe pattern appearing on the surface of the optical sheet 30, 40:

$T/t = n + 0.4$ $T/t = n + 0.6$ wherein the symbols have the same meaning as described above with reference to the preceding formula: t represents the pitch of the groove segments 75 arranged on the mold surface 72 along the central axis CA (see FIG. 8B), T represents the distance between one end e1 of each unit section US of the groove 74 and the other end e2 of the unit section US in a direction along the central axis CA (see FIG. 8B), and n is a natural number. In making a determination as to whether these formulae are satisfied, the left-hand side value is rounded off to one decimal place.

Table 1 shows the results of an experiment which was conducted by the present inventors. In the experiment, various optical sheets 30, 40 were produced in the below-described manner using molds 70 having various shapes of grooves 74, and a visual observation was made of a stripe pattern on the surface of each of the optical sheets 30, 40 produced. In the result column of Table 1, the symbol "O" indicates no visible stripe mark on the surface of the optical sheet; the symbol "Δ" indicates the presence of a visible stripe pattern on the surface of the optical sheet, but at such a level as not to cause a problem; and the symbol "x" indicates the presence of a highly-visible stripe pattern on the surface of the optical sheet.

TABLE 1

|  | T (mm) | t (mm) | Ratio (T/t) | Results |
| --- | --- | --- | --- | --- |
| Sample 1 | 0.1710 | 0.050 | 3.4 | O |
| Sample 2 | 0.1830 | 0.090 | 2.0 | X |
| Sample 3 | 0.1830 | 0.070 | 2.6 | O |
| Sample 4 | 0.1830 | 0.060 | 3.1 | X |
| Sample 5 | 0.1830 | 0.060 | 3.1 | X |
| Sample 6 | 0.1830 | 0.050 | 3.7 | Δ |
| Sample 7 | 0.0815 | 0.032 | 2.5 | Δ |
| Sample 8 | 0.0975 | 0.032 | 3.0 | X |
| Sample 9 | 0.2050 | 0.060 | 3.4 | O |
| Sample 10 | 0.2500 | 0.090 | 2.8 | X |
| Sample 11 | 0.1940 | 0.090 | 2.2 | X |
| Sample 12 | 0.2140 | 0.090 | 2.4 | O |
| Sample 13 | 0.3330 | 0.090 | 3.7 | X |
| Sample 14 | 0.2220 | 0.090 | 2.5 | X |
| Sample 15 | 0.2150 | 0.090 | 2.4 | O |
| Sample 16 | 0.2050 | 0.064 | 3.2 | X |
| Sample 17 | 0.2190 | 0.064 | 3.4 | O |

An exemplary method for the production of the mold 70 will now be described.

First, as shown in FIG. 9A, while rotating a circular cylindrical or round columnar base material 71 about its central axis CA, a cutting tool 78 is moved in a direction perpendicular to the central axis CA and caused to cut into the base material 71.

Next, as shown in FIG. 9B, the cutting tool 78 is moved in a direction parallel to the central axis CA while rotating the base material 71 about the central axis CA, thereby forming a spiral groove 74 in the peripheral surface of the base material 71. In the illustrated embodiment, the segments of the groove 74 are arranged side by side with no space therebetween on the peripheral surface of the base material 71.

Figure 10:
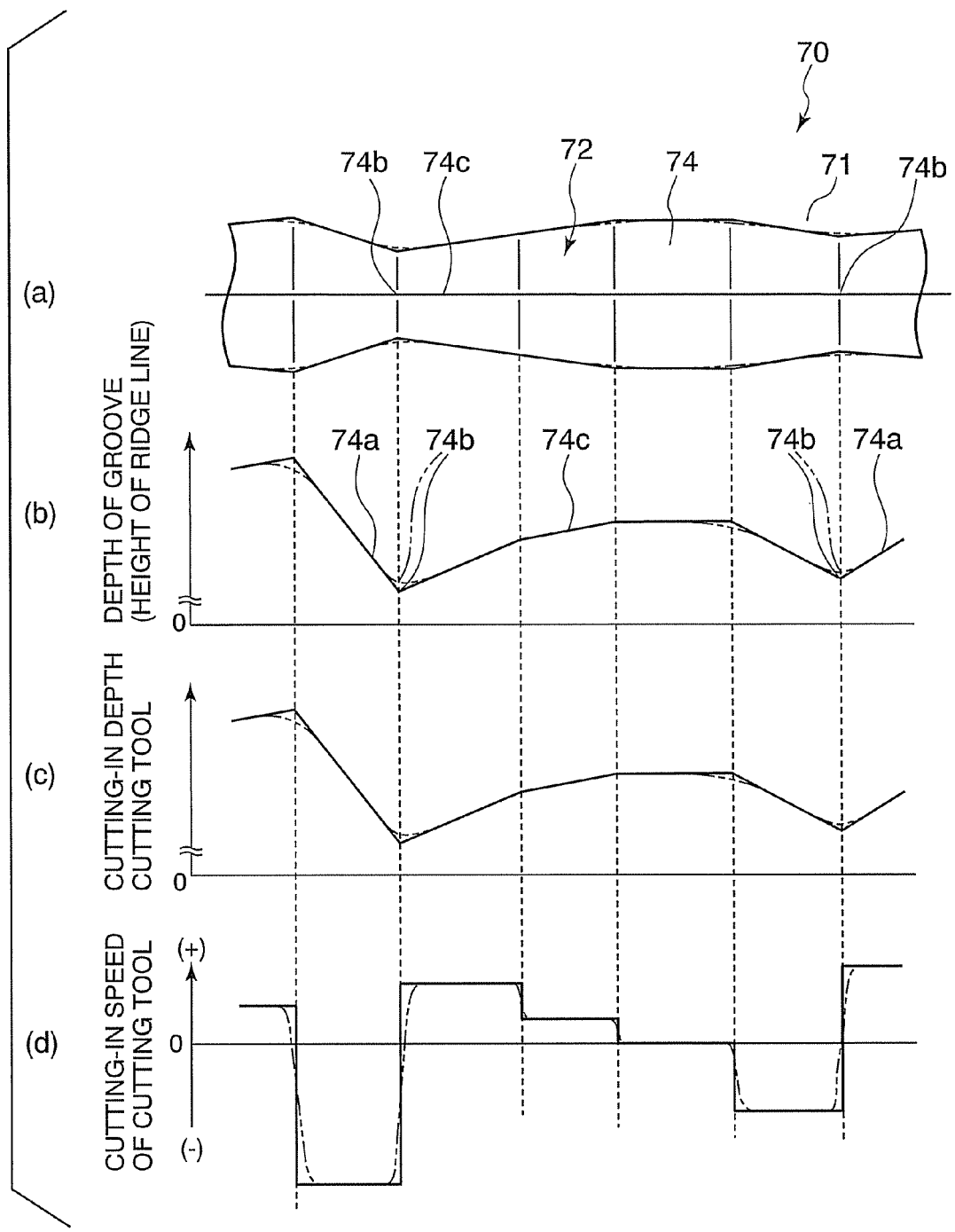
FIG. 10 is a diagram for explaining a method for producing the mold incorporated in the molding apparatus of FIG. 7.

While forming the spiral groove 74, the cutting tool 78 moves also in a direction perpendicular to the central axis CA. In the direction perpendicular to the central axis CA, the cutting tool 78 moves closer to and away from the central axis CA. The movement speed of the cutting tool 78 in the direction perpendicular to the central axis CA is changed in a stepwise manner as shown in FIG. 10(d). Thus, the acceleration of the movement speed of the cutting tool 78 in the direction perpendicular to the central axis CA is 0. Accordingly, as shown in FIG. 10(c), the cutting-in depth of the cutting tool 78 in the direction perpendicular to the central axis CA changes in a polygonal line during the formation of the groove 74. Consequently, the depth of the groove 74, formed by moving the cutting tool 78 back and forth in the direction perpendicular to the central axis CA, changes in a polygonal line with the change in the cutting-in depth of the cutting tool 78, as shown in FIG. 10(*b*). Further, the height of the unit prisms 35, 45, which are shaped by the groove 74 thus produced, also changes in a polygonal line with the change in the cutting-in depth of the cutting tool 78. FIG. 10(*a*) is a top view of the groove 74 formed in the above-described manner.

The movement of the cutting tool 78 is performed by means of a mechanism, such as a servo motor. When the movement of the cutting tool 78 is controlled by a mechanism such as a servo motor, it is practically difficult to move the cutting tool 78 at a programmed speed to a programmed position in the light of the technical level of commercially-available apparatuses for the production of molds. Thus, an actual machining apparatus may not be capable of changing the movement speed of the cutting tool 78 in an exact stepwise manner (pattern) as programmed. There may therefore be a case in which, in expectation of such a response delay, the cutting tool 78 is moved at a different speed from a programmed speed to control the cutting tool 78 in order that the cutting tool 78 reaches a predetermined position at a predetermined time. Thus, despite an attempt to change the movement speed of the cutting tool 78 in a stepwise manner, it is sometimes not possible, due to limitations in mold production technique, to change the movement of the cutting tool 78 in a stepwise manner in the strict sense, as illustrated by the dashed-double dotted lines in FIG. 10. Consequently, it is sometimes not possible to change in a polygonal line the depth of the groove 74 of the mold 70 as well as the height of the ridge lines La of the unit prisms 35, 45 produced by using the mold 70. As described above, a polygonal line-like shape which reflects limitations in production technique, a molding error, etc. and which is not a polygonal line in the strict sense, is herein taken as a "polygonal line". Similarly, change in the movement speed of the cutting tool 78 in a pattern which reflects limitations in production technique, a molding error, etc. and which is not a stepwise manner in the strict sense, is herein taken as a "stepwise manner" change in the movement speed.

The mold 70 can be produced by forming the spiral groove 74 for shaping of the unit prisms 35, 45 in the base material 71 in the above-described manner. The depth of the groove 74 formed changes in a polygonal line along the longitudinal direction of the groove 74 complementarily with the above-described polygonal line defined by the ridge lines La of the unit prisms 35, 45. Thus, irregularities which are complementary with the above-described irregularities defined by the ridge lines La of the unit prisms 35, 45, are formed by the bottom 74*c* of the groove 74 along the longitudinal direction of the groove 74. The depth of the groove 74 is not constant but varies at positions corresponding to the deepest portions 74 of recessed portions 74*a* formed by the bottom 74*c* of the groove 74.

A method for producing the optical sheet 30 by using the molding apparatus 60 will now be described. First, a sheet material 52, e.g. made of a transparent resin, is supplied from a base molding material supply apparatus 62 to the molding apparatus 60. As show in FIG. 7, the sheet material 52 supplied is fed to the mold 70 and held by the mold 70 and a pair of rollers 68 such that the sheet material 52 faces the uneven surface 72 of the mold 70. The supply speed of the sheet material 52 is synchronized with the peripheral speed of the rotating mold 70.

As shown in FIG. 7, concomitantly with the supply of the sheet material 52, a material 54 having fluidity is supplied from a material supply apparatus 64 to between the sheet material 52 and the mold surface 72 of the mold 70 such that the entire area of the mold surface 72 is covered with the material 54. The expression "having fluidity" herein means that the material 54, supplied to the mold surface 72 of the mole 70, has such a degree of fluidity as to enable entry of the material into the groove 74 of the mold surface 72.

Though a variety of materials which are known to be usable for molding can be used as the material 54, it is preferable to use a resin which has good moldability and excellent light transmittancy and is easily available. For example, a transparent cured (crosslinked) material of a composition of a polyfunctional urethane acrylate oligomer and a dipentaerythritol hexaacrylate monomer, having a refractive index of 1.57, can be preferably used as the material 54 to be supplied from the material supply apparatus 64. In the embodiment described below, an ionizing radiation-curable resin is supplied from the material supply apparatus 64. A UV curable resin to be cured by ultraviolet (UV) irradiation or an EB curable resin to be cured by electron beam (EB) irradiation, for example, may be used as an ionizing radiation-curable resin.

Thereafter, the molding sheet material 52 with an ionizing radiation-curable resin 54 on it, which resin fills the space between the sheet material 52 and the mold surface 72 of the mold 70, passes by a curing apparatus 66. Ionizing radiation that is suited for the curing properties of the ionizing radiation-curable resin 54 is emitted from the curing apparatus 66. The ionizing radiation passes through the sheet material 52 and is applied to the ionizing radiation-curable resin 54. This causes curing of the ionizing radiation-curable resin 54 on the mold surface 72, whereby the unit prisms 35, 45 and the surface portion of the body portion 32, 42 on the side of the surface 32*a*, 42*a*, both made of the cured resin, is formed on the sheet material 52.

Thereafter, as shown in FIG. 7, the sheet material 52 is detached from the mold 70, and the unit prisms 35, 45 formed in the groove 74 of the mold surface 72 are separated from the mold 70 along with the sheet material 52. The above-described optical sheet 30, 40 is thus obtained.

In this example explained here, the material 54 spreads over the entire area of the mold surface 72 having the groove 74, as described above, and the sheet material 52 is not in contact with the surface of the mold 70. Consequently, the body portion 32, 42 of the optical sheet 30, 40 produced is composed of the sheet material 52 and the sheet-like cured material 54. This molding method can effectively prevent the molded unit prisms 35, 45 from partly remaining in the mold 70 upon their detachment from the mold 70.

While the roll shaped mold 70 rotates 360 degrees about the central axis CA, the step of supplying the material 54 having fluidity into the mold 70, the step of curing the material 54 in the mold 70 and the step of drawing the cured material 54 from the mold 70 are carried out sequentially on the mold surface 72 of the mold 70 in the above-described manner to produce the optical sheet 30, 40.

The operations of the optical sheet 30, 40, the surface light source device 20 and the transmission type display device will now be described. The overall operation of the transmission type display device 10 and the surface light source device 20 will be described first.

Light emitted from the light source 25 travels toward the viewer side directly or after reflecting on the reflective plate 22. The light, traveling toward the viewer side, is isotropically diffused by the light diffusing sheet 28 and then enters the first optical sheet 30.

As shown in FIG. 6, lights L61, L62, L63 that exit from the first unit prisms 35 of the first optical sheet 30 are refracted at the light exit side surface (lens surface) of the unit prisms (unit shaped elements) 35. Due to the refraction, the lights L61, L62, L63, traveling in a direction inclined from the front direction nd, are bent such that the angle of the travel direction (exit direction) of each light with respect to the normal direction nd of the sheet plane of the first optical sheet 30 becomes smaller. Such action of the first unit prisms 35 can condense (collect) transmitted light in the front direction nd. The first unit prisms 35 thus exert a light condensing effect (light collecting effect) on transmitted light.

The light condensing effect of the first unit prisms 35 is larger for light that travels in a direction more inclined from the front direction nd. Therefore, though depending on the degree of light diffusion by the light diffusing sheet 28 disposed on the light source side of the first optical sheet 30, the front direction luminance can be more effectively enhanced in a region, lying farther away from the light source 25, where a larger amount of light from the light source 25 tend to enter at a large incidence angle (see light L61 of FIG. 6).

On the other hand, light 64, traveling in a direction at a small inclination angle with respect to the front direction nd, repeats total reflections on the light exit side surface (prism surface) of the first unit prisms 35 and turns toward the light entrance side (light source side). Especially when the apex angle (in the main cross-section) of each unit prism 35 is around 90°, the total reflection will be retroreflection as shown in FIG. 6. Therefore, though depending on the degree of light diffusion by the light diffusing sheet 28 disposed on the light source side of the first optical sheet 30, the luminance can be prevented from becoming too high in a region, lying right above the light source 25, where a large amount of light from the light source 25 tends to enter at a small incidence angle.

The optical effect of the first unit prisms 35 on transmitted light thus differs depending on the distance from the light source 25. This can effectively reduce luminance variation (also called tube-derived contrast lines or light source image) produced by the arrangement of the light emitting parts of the light source 25, thereby obscuring the image (light image) of the light source. Thus, the first optical sheet 30 also has a light diffusing function to equalize the in-plane luminance.

Light that has exited from the first optical sheet 30 enters the second optical sheet 40, where the light is subject to optical effects, which are the same as the above-described effects exerted by the first unit prisms 35, exerted by the second unit prisms 45 of the second optical sheet 40. The light condensing function and the light diffusing function of the unit prisms 35, 45 are mainly performed in the arrangement direction of the unit prisms 35, 45 (lateral direction in FIG. 6). As shown in FIG. 1, the arrangement direction of the first unit prisms 35 is perpendicular to the longitudinal direction of the light source 25 and the arrangement direction of the second unit prisms 45 is parallel to the longitudinal direction of the light source 25. The direction of light exiting from the first and second optical sheets is thus narrowed down, in two different directions, to a narrow angle range about the front direction.

Light that has exited from the surface light source device 20 (second optical sheet 40) enters the transmission type display unit 15. The transmission type display unit 15 transmits the light from the surface light source device 20 selectively for each pixel, so that a viewer of the transmission type display device 10 can view images.

Incidentally, when the optical sheet 30, 40 is superimposed on another member to construct the surface light source device 20 and the transmission type display device 10, the possibility of the above-described problems, such as "wet-out" and "Newton's rings", due to contact of the optical sheet 30, 40 with an adjacent member may be conceivable. The optical sheet 30, 40 of this embodiment, however, can avoid such conceivable problems due to contact of the optical sheet 30, 40 with an adjacent member, as described below.

In this embodiment, as shown in FIG. 1, the first optical sheet 30 is disposed such that the first unit prism 35-side surface faces the optical sheet 40. Thus, the first unit prisms 35 of the first optical sheet 30 make contact with the smooth light entrance side surface (light entrance side surface 42b of the body portion 42) of the second optical sheet 40 adjacent to the first optical sheet 30.

The second optical sheet 40 provides the light emitting surface 21 of the surface light source device 20; the second unit prism 45-side surface of the second optical sheet 40 faces the transmission type display device 15. Thus, the second unit prisms 45 of the second optical sheet 40 make contact with the smooth light entrance side surface of the transmission type display device 15 adjacent to the second optical sheet 40.

As described above, the height of each unit prism 35, 45 changes along the longitudinal direction of the unit prism 35, 45. Accordingly, the first unit prisms 35 of the first optical sheet 30 will not make contact with the smooth light entrance side surface 42b of the second optical sheet 40 in a long linear contact area. Similarly, the second unit prisms 45 of the second optical sheet 40 will not make contact with the smooth light entrance side surface of the transmission type display unit 15 in a long linear contact area. Thus, the contact area between the unit prisms 35, 45 of the optical sheet 30, 40 and another member can be significantly decreased in comparison with the optical sheet disclosed in U.S. Pat. No. 7,072,092. This can significantly reduce the occurrence of problems, such as "wet-out" and "Newton's rings", due to contact of the optical sheet 30, 40 with an adjacent member.

Especially in the optical sheet 30, 40 of this embodiment, the height of each unit prism 35, 45 changes in a polygonal line in the longitudinal direction of the unit prism 35, 45. Thus, each unit prism 35, 45, when viewed in the arrangement direction of the unit prisms 35, 45, has a polygonal line-shaped contour. Therefore, as shown in FIG. 5, the unit prisms 35, 45 make contact with another member, adjacent to the optical sheet 30, 40, only in point-like areas or linear areas having a limited length (37a, 47a) in the longitudinal direction of the unit prisms 35, 45. Such contact will be maintained even when the optical sheet 30, 40 or an adjacent optical member (e.g. the transmission type display unit 15) bends or warps to some extent e.g. by an external force. The size (length and area) of each of the contact areas between the unit prisms 35, 45 of the optical sheet 30, 40 and another member can therefore be kept constantly small.

On the other hand, in the conventional optical sheet disclosed in JP 8-304608A, each unit prism has an arc-shaped contour when it is viewed in the arrangement direction of the unit prisms, and the top of the contour of the unit prism, the farthest point from the body portion, is defined as a point on the continuous curved line. When the continuous curved line (curved surface) makes contact with a straight line (plane) at the point, the contact can be approximated by contact between two parallel straight lines (planes) in the vicinity of the contact point. Thus, the range (length and area) of contact between the unit prisms of the optical sheet of JP 8-304608A and another member in the longitudinal direction of the unit prisms is considerably larger than the range of contact [contact between nonparallel two straight lines (planes) having different directions] between the unit prisms 35, 45 of the optical sheet 30, 40 of this embodiment and another member in the longitudinal direction of the unit prisms 35, 45. Therefore, compared also to the optical sheet disclosed in JP 8-304608A, the optical sheet 30, 40 of this embodiment can effectively reduce the occurrence of problems, such as "wet-out" and "Newton's rings", due to contact of the optical sheet 30, 40 with an adjacent member.

Further, in the optical sheet disclosed in JP 8-304608A, the range (length) of the contact area between the unit prisms of the optical sheet and another member will become enlarged (longer) in the longitudinal direction of the unit prisms in sensitive response to deformation of the optical sheet (unit prisms), such as deflection or warpage, caused by the contact pressure between the optical sheet and the another member.

According to this embodiment, on the other hand, because of the polygonal line-shaped change in the height of the unit prisms 35, 45 in the longitudinal direction, there is no fear of a significant change in the range (length) of a contact area between the unit prisms 35, 45 of the optical sheet 30, 40 and another member in the longitudinal direction of the unit prisms 30, 40 in response to deformation of the optical sheet 30, 40 (unit prisms), such as deflection or warpage.

As described above, in the optical sheet 30, 40 of this embodiment, the height of the contour of each unit prism 35, 45 changes in an uneven polygonal line. As shown in FIG. 5, with reference to the raised portions 37, 47 defined by the polygonal line-shaped contour of each unit prism 35, 45, the distance (height) da between the top 37a, 47a of each raised portion 37, 47, the farthest point from the body portion 32, 42 in the raised portion, and the body portion 32, 42 in the normal direction nd of the body portion 32, 42 is not constant but varies. Thus, in the normal state of the optical sheet 30, 40 of this embodiment, not all the tops 37a, 47a of the unit prisms 35, 45 are in contact with an adjacent member. Those tops 37a, 47a of the unit prisms 35, 45 which are not in contact with an adjacent member in the normal state of the optical sheet 30, 40 can come into contact with the adjacent member upon overall and large deformation, such as deflection, of the optical sheet 30, 40 (unit prisms). By increasing the number of such tops 37a, 47a that may come into contact with another member upon overall deformation, such as deflection, of the optical sheet 30, 40 (unit prisms), it becomes possible to prevent the range of each contact area between a top 37a, 47a of a unit prism 35, 45 and an adjacent member from becoming enlarged to such an extent as to cause problems. Thus, if deformation, such as deflection of the optical sheet 30, 40 (unit prisms 35, 45) occurs due to the contact pressure between the optical sheet 30, 40 and another member, the contact area between the unit prisms 35, 45 and the adjacent member can be scattered. This can effectively prevent the occurrence of problems due to the contact of the optical sheet 30, 40 with the adjacent member.

As described above, each unit prism 35, 45 is comprised of columnar segments extending different directions, having the same cross-sectional shape and arranged side by side. As shown by the dashed-double dotted line in FIG. 6, in the main cross-section of the optical sheet in which the optical effects of the unit prisms 35, 45 are mainly exerted, the unit prisms 35, 45 have approximately the same contour regardless of the heights of the apices 36, 46. That is to say, the cross-sectional shape in the main cross-section of the optical sheet does not change substantially along the longitudinal direction of the unit prisms 35, 45. Accordingly, in the main cross-section of the optical sheet, lights L63, L63a exit from the unit prism 35, 45 at approximately the same exit angle regardless of the height of the apex 36, 46. Therefore, in this embodiment in which, in a top view (when viewed in the normal direction nd of the optical sheet 30, 40), the ridge line of each unit prism 35, 45 extends in a straight line parallel to the unit prism 35, 45, a visible optical singularity hardly forms due to the polygonal line-shaped change in the height of the unit prisms 35, 45. It has been confirmed that especially when the pitch of the raised portions 37, 47 in the longitudinal direction of the unit prisms 35, 45 falls within the above-described range (not less than 70 μm and not more than 900 μm) and, in addition, the amplitude of the ridge line La in the normal direction of the body portion 32, 42 falls within the above-described range (not less than 1 μm and not more than 10 μm), the occurrence of problems, such as "wet-out" and "Newton's rings", due to contact of the optical sheet 30, 40 with an adjacent member can be effectively prevented and the formation of a visible optical singularity can also be prevented.

It has been found through the present inventors' studies that a high front direction luminance can be achieved by the optical sheet 30, 40 and the surface light source device 20 of this embodiment.

As is often the case, a surface light source device incorporates two optical sheets, each having a linear array of unit prisms, superimposed on each other such that their unit prism arrangement directions intersect each other, as shown in FIG. 1. Such a surface light source device often fails to secure an expected front direction luminance. The problem becomes remarkable when the pitch of the unit prisms is short. As a cause of the problem, it may be considered that the contour of the unit prism in the main cross-section of the optical sheet is distorted from the intended shape (e.g. geometrically ideal triangular prism) due to limitations in production technique, a molding error, etc. That is to say, the fact that the optical sheet has a different shape from the intended shape, and therefore the optical sheet cannot exert expected optical properties, may be considered as a cause of the problem.

Figure 11:
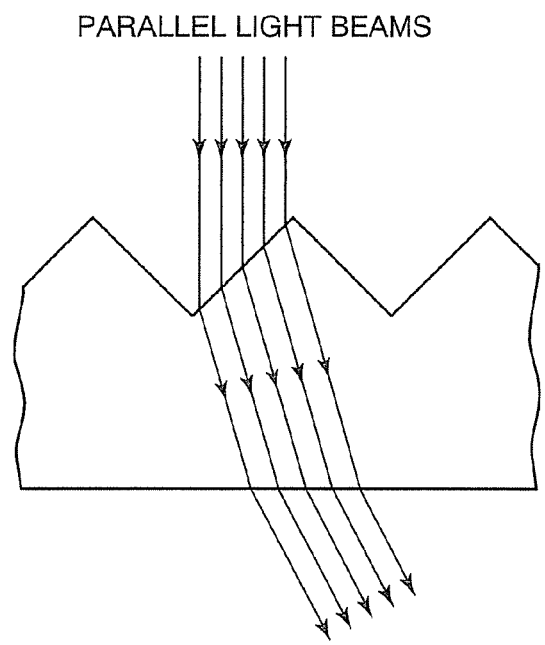
FIG. 11 is a cross-sectional view corresponding to FIG. 4, for explaining a method for measuring optical properties of an optical sheet.

The present inventors have devised a method as shown in FIG. 11 as a method to examine or evaluate optical properties of an optical sheet. In this method, parallel light beams, traveling in the normal direction (of the sheet plane) of an optical sheet, are made to enter the unit prism-side surface (the light exit side surface of the optical sheet 30, 40 in the above-described embodiment) of the optical sheet, and the angular distribution of the luminance of light beams exiting from the non-prism side surface (the light entrance side surface of the optical sheet 30, 40 in the above-described embodiment) is measured.

Assuming that the cross-sectional shape of the unit prism in the main cross-section is an isosceles triangle as in the above-described embodiment, the light beams will exit from the non-prism side surface of the optical sheet in a single direction specified by the inclination angle of the prism surface of the unit prism and the refractive index of the optical sheet, as shown in FIG. 11. When light beams from a light source are made to enter the optical sheet along the light beam path of FIG. 11 but in the opposite direction, the exiting light beams are to be condensed in the normal direction of the entrance surface. This is the principle in the optical design of a light source device using such an optical sheet. Practically, however, the light beams will exit from the unit prism in directions in a certain angular range (±a few degrees) due to light diffraction or multiple reflection of light, not shown in FIG. 11. Thus, in the measurement of the luminance of the exiting light beams, the luminance is expected to be measured not at a single angle but in a certain angular range, including the direction shown in FIG. 11.

Figure 12:
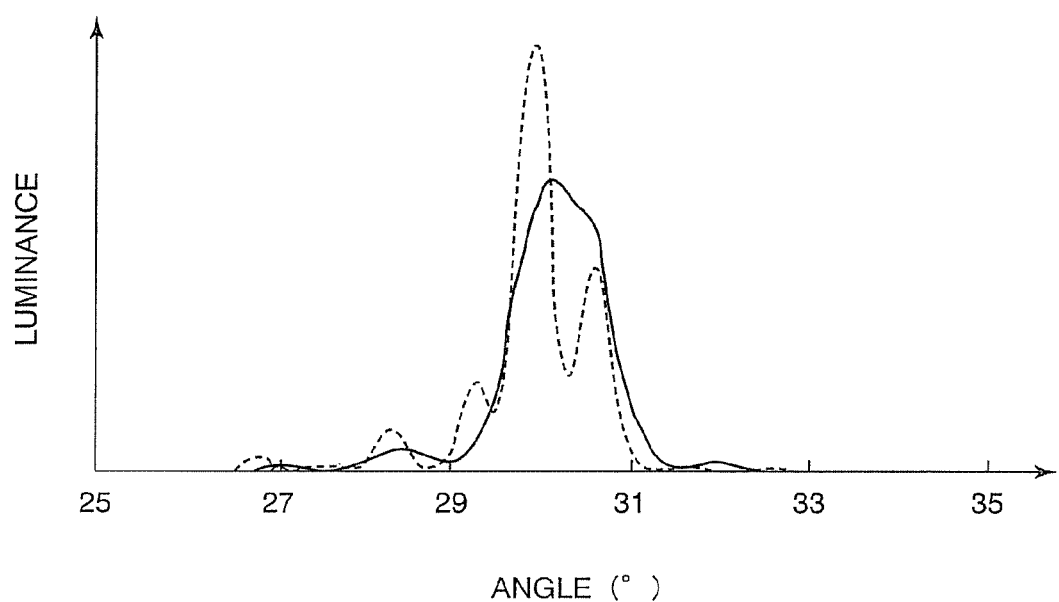
FIG. 12 is a graph showing an example of the angular distribution of luminance measured by the method shown in FIG. 11.

However, in actual luminance measurements that were conducted by the present inventors on an optical sheet including linearly-extending conventional unit prisms having a constant cross-sectional shape, the angular distribution of the luminance of exiting light beams, which travel along the light path shown in FIG. 11, often had two or more peaks as shown by the dashed-double dotted line in FIG. 12. It is inferable from the angular distribution of luminance that in the contour (prism surface) of the unit prism in the main cross-section of the optical sheet, the portion which should be a straight line is actually composed of (or equivalent to) two or more segments having different inclination angles. Consequently, even if light from the light source is designed to travel along the light path of FIG. 11 but in the opposite direction, the exiting light will actually include not only parallel light beams traveling in the normal direction of the light entrance surface but also light beams traveling in directions deviated from the normal direction, resulting in lowering of the normal direction luminance from a designed value.

On the other hand, the angular distribution of luminance of the optical sheet 30, 40 of this embodiment has been found to have only one peak as shown by the solid line in FIG. 12. As described above, the unit prism of this embodiment is composed of columnar segments having a constant cross-sectional shape, consecutively arranged in an uneven polygonal line. It is therefore inferable that transmitted light will be diffused to a hardly visible extent and, though the details are unclear, the influences of the optical strains of the unit prisms 35, 45 will be canceled each other. This may make the angular distribution of luminance smooth even when the contour of the unit prism 35, 45 is slightly distorted for some reason. On the other hand, even though the deviation from the ideal trajectory of light beams, shown in FIG. 11, is as small as ±a few degrees in one conventional optical sheet, the deviation will synergistically increase when another optical sheet is superimposed on the optical sheet. This seemed to increase the above-described lowering of luminance from the theoretical value.

Especially a unit prism whose cross-sectional shape in the main cross-section is an isosceles right triangle which is symmetrical with respect to an axis extending in the front direction, functions to deflect light, traveling in an inclined direction in the optical sheet, into the front direction and, at the same time, functions to return light, traveling in the front direction in the optical sheet, toward a light source by total reflection of the light. An optical sheet, having unit prisms whose cross-sectional shape is an isosceles right triangle, is designed to secure a considerably high front direction luminance through the action of returning light, which cannot exit in the front direction, toward a light source by retroreflection. Compared to such a conventional commercially-available optical sheet having unit prisms whose height is constant, the optical sheet 30, 40 of this embodiment is considered to be capable of retroreflection of light, traveling in the front direction, more as expected, for some reason. In fact, in the measurement of total light beam transmittance made in accordance with JIS K 7361, which was performed by the present inventors for an optical sheet under the conditions that the light entrance side surface of the body portion serves as a light entrance surface and the surface (prism surface) of the unit prisms of the optical sheet serves as a light exit surface, the total light beam transmittance was more than 4.5% for a conventional optical sheet having unit prisms whose cross-sectional shape is an isosceles right triangle and whose height is constant, whereas the total light beam transmittance was not more than 4.5% for the above-described optical sheet of this embodiment.

For the above inferable reasons, the optical sheet 30, 40 of this embodiment, having the unit prisms 35, 45 each having a polygonal line-shaped contour in the longitudinal direction, is considered to be capable of achieving the angular distribution of luminance which is nearer to the expected one, as compared to a conventional optical sheet having unit prisms extending in a straight line. According to the surface light source device 20 including such optical sheets 30, 40 of this embodiment, the front direction luminance can be raise by a few percent (2% to 5%) than that of a surface light source device using two such conventional optical sheets and, in addition, the front direction luminance can be made near to the expected one. Although the inferable mechanism of the increase in the front direction luminance of the surface light source device 20 by the use of the optical sheets 30, 40 having the unit prisms 35, 45 whose height changes in a polygonal line has been described, the present invention is not bound by the mechanism.

The above-described optical sheet disclosed in JP 2008-544303T, because of the two-dimensional irregular arrangement of irregular prism blocks, may be capable of reducing problems due to contact of the optical sheet with another member. However, the optical function performed by the irregularly-arranged irregular prism blocks greatly differs from the optical function performed by linearly-extending unit prisms. Specifically, the irregular prism blocks, when designed to effectively reduce problems due to contact of the optical sheet with another member, mainly perform not a light condensing function but a light diffusing function. On the other hand, the optical sheet 30, 40 of this embodiment not merely maintains a light condensing function but effectively performs the function as expected and, at the same time, can effectively reduce problems due to contact with another member, as described above.

Various modifications can be made to the above-described embodiments. The following are exemplary variations.

Figure 13:
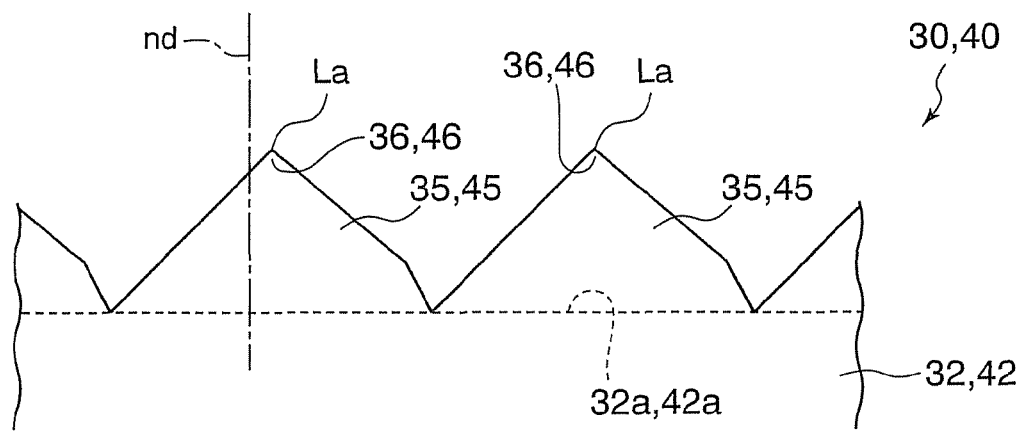
FIG. 13 is a diagram corresponding to FIG. 4, for explaining a variation of unit prisms.

Though in the above-described embodiment the cross-sectional shape of each unit prism 35, 45 in the main cross-section of the optical sheet is a triangular shape, the triangular cross-sectional shape may be modified or deformed e.g. to impart various properties to the unit prisms. For example, with a view to adjusting the optical function of the unit prisms, the cross-sectional shape of each unit prism 35, 45 in the main cross-section of the optical sheet may be a shape in which at least one side (facet of triangular prism) of a triangle is bent as shown in FIG. 13, a shape in which at least one side of a triangle is curved (fan-like shape), a shape in which the apex of a triangle is rounded, or a shape in which micro irregularities are formed in at least one side. The cross-sectional shape of each unit prism 35, 45 may be a shape other than a triangular shape, for example, a quadrangular shape such as a trapezoidal shape, or another polygonal shape such as a pentagonal or hexagonal shape. Further, the cross-sectional shape of each unit prism 35, 45 in the main cross-section of the optical sheet may be a shape corresponding to part of a circle or an ellipse.

Though in the above-described embodiment the unit prisms 35, 45 of the optical sheet 30, 40 all have the same cross-sectional shape, the optical sheet 30, 40 may also include unit prisms having a different cross-sectional shape.

Figure 14:
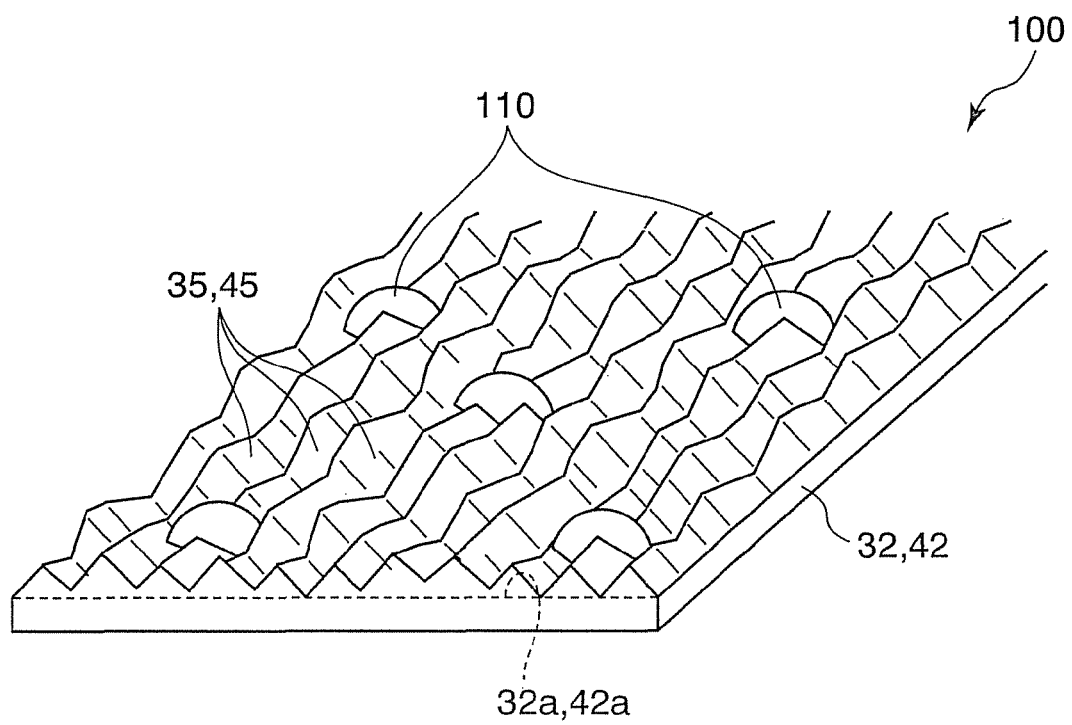
FIG. 14 is a perspective view showing one variation of the optical sheet.

Though in the above-described embodiment only the unit prisms 35, 45 are formed on one surface of the body portion 32, 42 of the optical sheet 30, 40, the present invention is not limited to such embodiment. For example, like the optical sheet 100 shown in FIG. 14, it is possible to arrange hemispherical unit lenses 110 on one surface of the body portion 32, 42 such that the lenses 110 are disposed on the lattice points of an equilateral-triangular lattice, and to arrange the unit prisms 35, 45 of the above-described embodiment between the hemispherical unit lenses 110. In the embodiment shown in FIG. 14, the height of the hemispherical unit lenses 110 from the body portion 32, 42 is higher than that of the unit prisms 34, 35. Further, in the embodiment shown in FIG. 14, the optical sheet 100 is designed such that at least one unit prism 35, 45 is disposed in the space between adjacent hemispherical unit lenses 110. Compared to the optical sheet 30, 40 of the above-described embodiment, the optical sheet 100, owing to the scattered (two-dimensionally arranged) hemispherical unit lenses 110, can more effectively prevent problems ("wet-out", etc.) due to optical contact with the smooth surface of an adjacent optical member. This is because the scattered hemispherical unit lenses 110 function as spacers to keep a certain distance between the surface of the optical sheet 100 and the adjacent optical member. Further, compared to the optical sheet 30, 40 of the above-described embodiment, the optical sheet 100, while maintaining the light condensing function, can perform a higher light diffusing function through the light diffusing function of the hemispherical unit lenses 110. In FIG. 14, the same reference numerals as used in the above-described embodiment are used for those portions which may have the same construction as in the above-described embodiment.

The above-described method for the production of the optical sheet 30, 40 is not limitative of the present invention; the optical sheet 30, 40 may be produced by a different method. Similarly, the above-described method for the production of the mold 70 for shaping of the optical sheet 30, 40 is not limitative of the present invention; the mold 70 may be produced by a different method. For example, the groove 74 for the production of the unit prisms 35, 45 may be formed as multiple spiral grooves in the base material 71. In this case, for at least one groove of the multiple spiral grooves, the depth change may be designed as described above.

Though in the above-described embodiment each light emitting part (light emitter) of the light source 25 of the surface light source device 20 is comprised of a linear cold cathode fluorescent lamp, it is also possible to use other light emitting part, such as point-like LEDs (light emitting diodes), a planar EL (electroluminescence) light emitter, etc. for the light source 25. Though in the above-described embodiment the optical sheets 30, 40 are applied in the direct-type surface light source device 20, the optical sheets 30, 40 may be applied e.g. in an edge light-type (also called side light type) surface light source device. When used in an edge light-type surface light source device, the optical sheets 30, 40 can produce similar effects to those produced by the optical sheets when they are applied in the direct-type surface light source device 20.

Further, modifications may be made to the above-described overall construction of the surface light source device 20 and the transmission type display device 10 which include the optical sheets 30, 40. For example, other member(s), such as a polarization separation film or a retardation film, may be additionally incorporated into the surface light source device 20 and the transmission type display device 10.

Though in the above-described embodiment the optical sheets 30, 40 are disposed on the outermost light exit side of the surface light source device 20, this is not limitative of the present invention. Though in the above-described embodiment the unit prisms 35, 45 of the optical sheet 30, 40 are provided on the light exit side of the body portion 32, 42, the unit prisms may be provided on the light entrance side of the body portion 32, 42. As with the above-described embodiment, such variation can also effectively prevent problems due to contact between the optical sheet 30, 40 and another member disposed on the unit prism 35, 45 side of the optical sheet 30, 40.

Though in the above-described embodiment the optical sheets 30, 40 are incorporated into the surface light source device 20 for the transmission type display device 10, it is also possible to incorporate the optical sheets into light emitting devices having various light emitting functions (including illuminating functions). Examples of such light emitting devices include an indoor lighting device to be attached to a ceiling or a wall surface, an outdoor lighting device such as a gate light or a street light, an indicator light such as an emergency light or a guide light, a traffic sign, a luminous sign, a luminous face of a watch or an instrument, a flashlight, an insect repellent light, an agricultural light, a fishing light, etc.

Figure 15:
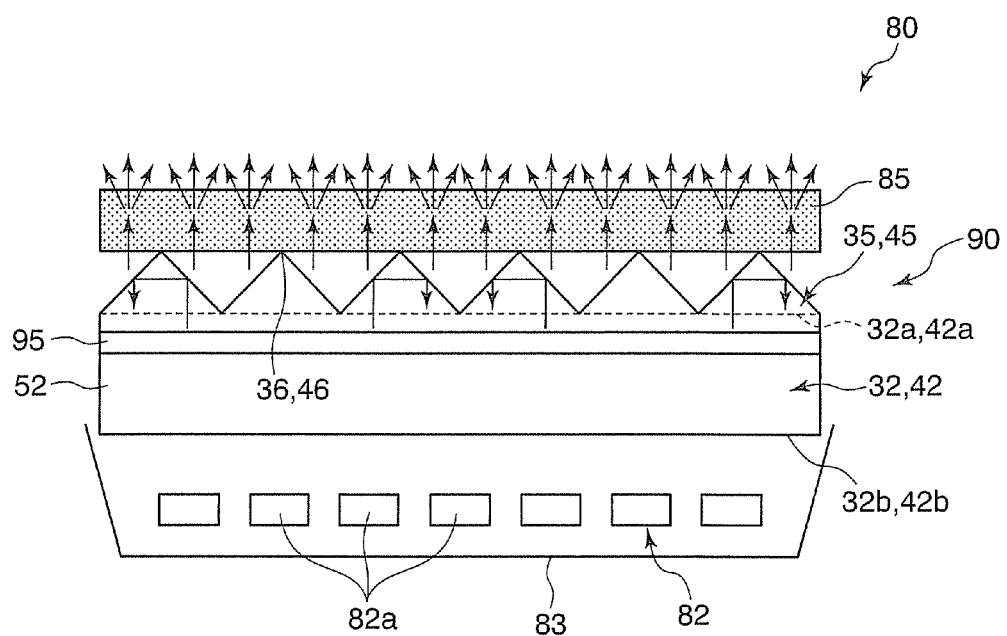
FIG. 15 is a diagram showing the schematic construction of an exemplary light emitting device including an optical sheet.

FIG. 15 shows an exemplary light emitting device 80 including an optical sheet 90. The light emitting device 80 includes a light source 82 comprised of a large number of light emitting diodes 82a two-dimensionally arranged on a plane, an optical sheet 90 disposed opposite to the light source 82, a light diffusing plate 85 disposed on the light exit side of the optical sheet 90, and a reflective plate 83 disposed behind the light source 82. In the light emitting device 80, light from the light source 82 travels toward the optical sheet 90 either directly or after reflecting on the reflective plate 83. As with the above-described embodiment, the optical sheet 90 exerts a light diffusing action and a light condensing action on incident light. Light exiting from the optical sheet 90 enters the light diffusing plate 85 and is isotropically diffused. Such light emitting device 80 can be used as a lighting device, an indicator light, a sign, or the like that emits light from the light exit surface, i.e. the light exit side surface of the light diffusing plate 85. As with the above-described embodiment, the light emitting device 80 can effectively prevent the occurrence of problems due to contact of the unit prisms 35, 45 of the optical sheet 90 with the adjacent member (light diffusing plate 85) and, in addition, can secure intended optical properties.

In FIG. 15, the same reference numerals as used in the above-described embodiment are used for those portions which may have the same construction as in the above-described embodiment. The optical sheet 90 incorporated in the light emitting device 80 shown in FIG. 15 differs from the optical sheet 30, 40 of the above-described embodiment in that the optical sheet 90 contains a color temperature conversion layer 95 for converting the color temperature of light emitted from the light emitting diodes 82a. The other construction of the optical sheet 90 may be the same as the optical sheet 30, 40 of the above-described embodiment.

The light emitting diodes 82a of the light source 82 of the light emitting device 80 shown in FIG. 15, unlike a cold cathode fluorescent lamp, can be designed to emit light having various color temperatures. When the optical sheet 90 contains the color temperature conversion layer 95 as in the illustrated embodiment, the color temperature of light emitted from the light emitting device 80 is determined by the light emitting diodes 82a of the light source 82 and the color temperature conversion layer 95 of the optical sheet 90. Such light emitting device 80 can control the color temperature of emitted light in various colors at a low cost. For instance, when the color of light emitted from the light emitting diodes 82a is white, the white color temperature can be changed, or the white color can be converted into a chromatic color. When the color of light emitted from the light emitting diodes 82a is a chromatic color, the hue of the chromatic color can be changed, or the chromatic color can be converted into white.

The color temperature conversion layer 95 may be, for example, a phosphor layer containing fluorescent substance, a pigment layer containing pigments, or an interference filter (bandpass filter) which mainly permits transmission of light having a wavelength in a particular band by utilizing interference of light. The optical sheet 90 shown in FIG. 15 can be produced by forming the unit prisms 35, 45 on the sheet material 52, on which the color temperature conversion layer 95 has been superimposed, by the above-described optical sheet production method.

Unlike the optical sheet 90 shown in FIG. 15, the color temperature conversion layer 95 may be formed as a layer constituting the light entrance surface of the optical sheet 90, or the unit prisms 35, 45 may constitute the color temperature conversion layer 95. Though in the light emitting device 80 shown in FIG. 15, the light source 82, like the light source of a so-called direct-type surface light source device, is comprised of the plurality of light emitting diodes 82*a* disposed opposite to the optical sheet 90, it is also possible to use a single light emitting diode 82*a* as the light source. Alternatively, like the light source of a so-called edge light-type surface light source device, it is possible to provide a light guide plate opposite to the optical sheet 90 and to provide a light emitting diode(s) as a light source lateral to the light guide plate. Further, the light source 82 of the light emitting device 80 may be comprised of a light emitting part (light emitter) other than a light emitting diode (e.g. cold cathode fluorescent lamp or electroluminescence device).

The above modifications and variations, of course, may also be made in an appropriate combination to the above-described embodiments.

The invention claimed is:

1. An optical sheet comprising:
a sheet-like body portion; and
unit prisms arranged on one surface of the body portion in an arrangement direction and each extending linearly in a direction intersecting the arrangement direction;
wherein each unit prism, when viewed in a direction parallel to the arrangement direction of the unit prisms, has an uneven polygonal-line-shaped contour, and wherein with reference to raised portions defined by the polygonal-line-shaped contour of each unit prism, a distance between a top of each raised portion, a farthest point from the body portion in the raised portion, and the body portion in a normal direction of the body portion is not constant;
wherein the unit prisms include unit prism groups, wherein each unit prism group has at least two unit prisms arranged side by side in the arrangement direction, and wherein each of the unit prisms in each unit prism group have a different construction with respect to one another;
wherein the unit prism groups are arranged side by side in the arrangement direction of the unit prisms and have the same construction; and
wherein a cross-sectional shape of the at least two unit prisms forming one unit prism group, in a main cross-section parallel to both the normal direction of the body portion and the arrangement direction of the unit prisms and at one position in a longitudinal direction of the unit prisms, is identical to the cross-sectional shape of unit prisms the number of which is the same as the at least two unit prisms and which are arranged side by side in an area spanning the one unit prism group and an adjacent unit prism group, in the main cross-section and at a certain position at a distance from the one position in the longitudinal direction of the unit prisms.

2. The optical sheet according to claim 1,
wherein each unit prism extends on the one surface of the body portion from one edge of the one surface to the opposite edge, and
wherein the unit prisms, when viewed in the normal direction of the body portion, extend linearly parallel to each other.

3. The optical sheet according to claim 1,
wherein a cross-sectional shape of each unit prism, in a main cross-section parallel to both the normal direction of the body portion and the arrangement direction of the unit prisms, includes an isosceles triangle which is symmetrical with respect to an axis extending in the normal direction of the body portion.

4. The optical sheet according to claim 3,
wherein the total light beam transmittance of the optical sheet, measured in accordance with JIS K 7361 in such a manner that the surface of the unit prisms serves as a light exit surface, is not more than 4.5%.

5. A surface light source device comprising:
a light source; and
the optical sheet according to claim 1 which receives light from the light source.

6. The surface light source device according to claim 5,
wherein the optical sheet is disposed such that the unit prism side surface constitutes a light emitting surface.

7. A transmission type display device comprising: a transmission type display unit; and the surface light source device according to claim 5, disposed opposite the transmission type display unit.

8. A surface light source device comprising:
a light source;
a first optical sheet which receives light from the light source; and
a second optical sheet which receives light from the light source, the second optical sheet being disposed opposite to the first optical sheet,
wherein the first optical sheet and the second optical sheet each include a sheet-like body portion, and unit prisms arranged on one surface of the body portion and each extending linearly in a direction intersecting an arrangement direction,
wherein the first optical sheet and the second optical sheet are disposed such that the arrangement direction of the unit prisms of the first optical sheet intersects the arrangement direction of the unit prisms of the second optical sheet, and
wherein at least one of the first optical sheet and the second optical sheet is the optical sheet according to claim 1.

9. A transmission type display device comprising:
a transmission type display unit; and
the surface light source device according to claim 8, disposed opposite to the transmission type display unit.

10. A light emitting device comprising:
a light source; and
the optical sheet according to claim 1 which receives light from the light source.

11. The light emitting device according to claim 10,
wherein the light source includes at least one light emitting diode, and
wherein the optical sheet includes a color temperature conversion layer for converting a color temperature of light emitted from the light emitting diode.

12. The light emitting device according to claim 10 further comprising a light diffusing plate disposed on a light exit side of the optical sheet.

* * * * *